(12) United States Patent
Erickson et al.

(10) Patent No.: US 9,889,941 B1
(45) Date of Patent: Feb. 13, 2018

(54) INFLATABLE DEPLOYMENT APPARATUS FOR DESCENT-RESTRAINT SYSTEM FOR AERIAL VEHICLES

(71) Applicant: Indemnis, Inc., Anchorage, AK (US)

(72) Inventors: Alan Erickson, Anchorage, AK (US); Amber McDonald, Anchorage, AK (US); Zachary Cawvey, Anchorage, AK (US)

(73) Assignee: INDEMNIS, INC., Anchorage, AK (US)

( * ) Notice: Subject to any disclaimer, the term of this patent is extended or adjusted under 35 U.S.C. 154(b) by 0 days.

(21) Appl. No.: 15/424,585

(22) Filed: Feb. 3, 2017

(51) Int. Cl.
*B64D 17/80* (2006.01)
*B64D 17/72* (2006.01)

(52) U.S. Cl.
CPC ............. *B64D 17/80* (2013.01); *B64D 17/72* (2013.01)

(58) Field of Classification Search
CPC ........ B64D 17/80; B64D 17/72; B64D 17/74; B64D 17/76; B64D 17/00; B64D 25/08; B64D 25/12; B64D 25/14
See application file for complete search history.

(56) References Cited

U.S. PATENT DOCUMENTS

| | | |
|---|---|---|
| 269,317 A | 12/1882 | Peace |
| 1,019,271 A | 3/1912 | Nelson |
| 1,189,112 A * | 6/1916 | Howorth ............... B64D 17/72 244/146 |
| 1,342,221 A | 6/1920 | McDonald |
| 1,678,537 A * | 7/1928 | Schonbrun ............ B64D 25/12 244/146 |
| 1,749,965 A * | 3/1930 | Arnaiz .................. B64D 25/12 244/146 |
| 1,855,320 A | 4/1932 | Schwabek |
| 1,861,784 A * | 6/1932 | Brown .................. B64D 17/72 244/138 R |
| 1,901,173 A | 3/1933 | Kuhn |

(Continued)

FOREIGN PATENT DOCUMENTS

| | | | |
|---|---|---|---|
| DE | 202015001833 U1 * | 9/2015 | ............ B64D 17/72 |
| WO | 2014/080409 A1 | 5/2014 | |

OTHER PUBLICATIONS

Holloway, "Dramatic "Safety Sphere" concept provides all-round protection for motorcyclists," Feb. 6, 2012, URL=http://www.gizmag.com/safety-sphere-motorcycle-airbag/21354/, download date Oct. 28, 2015, 9 pages.

(Continued)

*Primary Examiner* — Tien Q Dinh
*Assistant Examiner* — Alexander V. Giczy
(74) *Attorney, Agent, or Firm* — Seed IP Law Group LLP

(57) ABSTRACT

A system and method for resisting an uncontrolled descent or uncontrolled flight condition of an aerial vehicle, the system including a parachute having shroud lines attached to a canopy, a housing to store the parachute, an inflatable tube that attaches to and is stored in the housing, the tube having a distal end with a connector that connects to the shroud lines, and a source of fluid that couples to the tube and selectively introduces fluid into the enclosed interior of the inflatable tube to inflate the tube and force the distal end of the tube and the attached parachute out of the housing and away from the aerial vehicle, wherein the tube tethers the parachute to the aerial vehicle.

18 Claims, 29 Drawing Sheets

(56) References Cited

U.S. PATENT DOCUMENTS

| | | | |
|---|---|---|---|
| 2,369,286 A * | 2/1945 | De Lopez | B64D 17/00 244/146 |
| 2,993,667 A | 7/1961 | Cushman | |
| 3,622,108 A | 11/1971 | Mathewson | |
| 3,675,259 A | 7/1972 | Gilchrist | |
| 3,761,979 A | 10/1973 | Daughenbaugh | |
| 4,005,655 A | 2/1977 | Kleinschmidt et al. | |
| 4,050,657 A | 9/1977 | Murphy | |
| 4,105,173 A | 8/1978 | Bucker | |
| 4,205,811 A | 6/1980 | Palm et al. | |
| 4,215,836 A | 8/1980 | Zacharin | |
| 4,370,994 A | 2/1983 | Pittman | |
| 4,565,341 A * | 1/1986 | Zacharin | B64D 17/80 102/386 |
| 4,643,210 A | 2/1987 | Feld | |
| 4,648,568 A | 3/1987 | Phillips | |
| 4,793,575 A | 12/1988 | Butler | |
| 4,978,110 A | 12/1990 | Lin et al. | |
| 5,005,785 A | 4/1991 | Puskas | |
| 5,103,848 A | 4/1992 | Parsons | |
| 5,755,405 A | 5/1998 | Socha et al. | |
| 5,765,778 A | 6/1998 | Otsuka | |
| 5,836,544 A | 11/1998 | Gentile | |
| D433,726 S | 11/2000 | Peterson | |
| 6,164,595 A * | 12/2000 | Williams | B64D 25/08 244/139 |
| 6,318,390 B1 | 11/2001 | Innis | |
| 6,503,119 B1 | 1/2003 | Lapointe | |
| 6,565,041 B1 | 5/2003 | Young et al. | |
| 6,682,017 B1 | 1/2004 | Giannakopoulos | |
| 7,874,513 B1 | 1/2011 | Smith | |
| 8,016,239 B2 | 9/2011 | Hakki et al. | |
| 8,123,162 B2 | 2/2012 | Sirkis | |
| 8,186,625 B2 | 5/2012 | De Jong | |
| 8,191,831 B2 | 6/2012 | Nadir | |
| 8,375,837 B2 | 2/2013 | Goossen et al. | |
| D697,145 S | 1/2014 | Wong | |
| 2001/0048050 A1 * | 12/2001 | Grieser | B64D 17/80 244/152 |
| 2002/0070315 A1 | 6/2002 | Hilliard et al. | |
| 2003/0057327 A1 * | 3/2003 | Carroll | B64C 39/024 244/139 |
| 2003/0094544 A1 | 5/2003 | Yamada | |
| 2003/0234320 A1 | 12/2003 | Colting | |
| 2004/0045593 A1 | 3/2004 | Chang | |
| 2005/0087653 A1 | 4/2005 | Koch | |
| 2007/0152102 A1 | 7/2007 | Gargano et al. | |
| 2012/0018579 A1 | 1/2012 | Yan et al. | |
| 2014/0131507 A1 | 5/2014 | Kalantari et al. | |
| 2016/0368610 A1 * | 12/2016 | Erickson | B64D 25/00 |

OTHER PUBLICATIONS

The Greatest Bond Gadget of All-Time, Nov. 4, 2010, URL=https://www.youtube.com/watch?v=KKqdgvsbfFQ, in *The World Is Not Enough*, Metro-Goldwyn-Mayer, 1999, 2 pages. (Screenshot).

Tomich, "ComEd gets OK to deploy drones for power system inspections," Apr. 14, 2015, URL=http://www.eenews.net/stories/1060016677, download date Jan. 28, 2016, 3 pages.

* cited by examiner

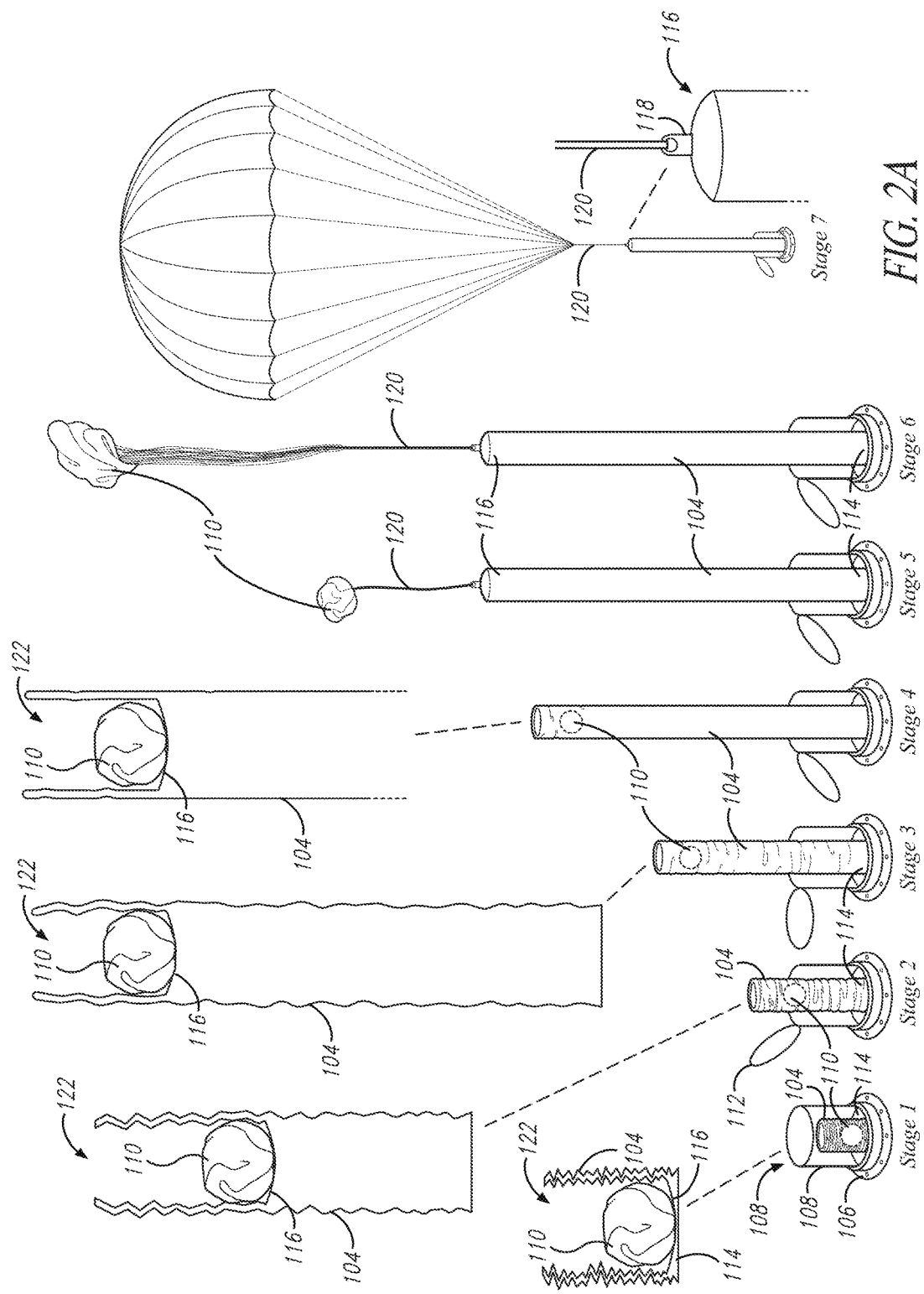

INFLATABLE DEPLOYMENT APPARATUS FOR DESCENT-RESTRAINT SYSTEM FOR AERIAL VEHICLES

BACKGROUND

Technical Field

The present disclosure pertains to aerial vehicle recovery, and more particularly to a system that deploys an aerodynamic decelerator away from the aerial vehicle to avoid entanglement of the decelerator with the aerial vehicle.

Description of the Related Art

The field of small aerial vehicles is growing, and continues to develop, for both military and civilian applications. This advancement has occurred with manned and unmanned aerial vehicles, as well as fixed-wing and single- and multi-rotor aerial vehicles. These advancements have led to aerial vehicles being used for various different activities. For example, law enforcement and the military use aerial vehicles for reconnaissance, attacking, defense, targeting, training, surveillance, and other uses. Similarly, civilians use aerial vehicles for hobby and recreational use, commercial aerial surveillance, professional aerial surveying, commercial and motion picture filmmaking, journalism, search and rescue, scientific research, pollution monitoring, oil, gas and mineral exploration and production, disaster relief, archaeology, transport, agriculture, and much more.

As aerial vehicles are being used for more diverse activities, the locations at which these vehicles are flown continues to expand, including in urban areas. As these technologies become smaller and more readily used in everyday life, both civilian and military, the possibility of these aerial vehicles causing harm to people or property resulting from an in-air failure continues to grow.

When an in-air failure occurs, aerial vehicles generally begin to plummet towards the ground. In-air failures generally cannot be corrected before the vehicle hits the ground due to low flying altitudes or non-recoverable failures (e.g., a dead battery). Such crashes can lead to serious injuries or death to people, as well as damage to property or the aerial vehicle itself.

Some aerial vehicles utilize traditional parachute systems to slow a descent of the vehicle. These traditional parachute systems, however, generally do not work unless the aerial vehicle is upright, level, and stable during the entire deployment phase of the parachute. Unfortunately, many in-flight failures result in sporadic and uncontrollable movement of the vehicle, especially in windy, rainy, or other variable environmental conditions. This sporadic motion often results in the parachute, or its lines, becoming entangled with the rotors, wings, or other components of the aerial vehicle as it deploys. As a result, the parachute is prevented from properly deploying, often resulting in the aerial vehicle crashing despite an attempt to deploy a traditional parachute system.

It is with respect to these and other considerations that implementations of the present disclosure have been made.

BRIEF SUMMARY

The present disclosure is directed to a system and method for resisting an uncontrolled descent of an aerial vehicle.

In accordance with one aspect of the disclosure, the system includes an aerodynamic decelerator, a housing, an inflatable tube, and an inflation mechanism. The aerodynamic decelerator is structured to create drag to reduce the velocity of the aerial vehicle in response to deployment of the aerodynamic decelerator. The housing is structured to be attached to the aerial vehicle and to store the aerodynamic decelerator in a folded state prior to deployment. The housing also includes a hatch that is structured to open in response to initiation of aerodynamic decelerator deployment. The inflatable tube is structured to be stored in the housing and to extend from the housing and launch the aerodynamic decelerator away from and clear of the aerial vehicle. The inflatable tube has a first end and a second end, the first end connected to the housing and the second end structured to connect to the aerodynamic decelerator and exit the housing with the aerodynamic decelerator in response to inflation of the inflatable tube. The inflation mechanism is operable to inflate the inflatable tube in response to detection of an uncontrolled condition, such as an uncontrolled descent or loss of control of the aerial vehicle. The inflatable tube is inflated through the first end to force the second end of the inflatable tube and the aerodynamic decelerator away from the aerial vehicle and to deploy the aerodynamic decelerator away from and clear of the aerial vehicle in response to extension of the inflatable tube.

In some implementations, the aerial vehicle includes a body with at least one motor providing power to at least one rotor and a descent detection system that is operable to detect an uncontrolled descent of the aerial vehicle and to output a signal indicating the uncontrolled descent.

In accordance with one aspect of the present disclosure, the housing further includes a base that is structured to removably mount the housing to the aerial vehicle.

In accordance with another aspect of the present disclosure, the housing is rigidly connected to the aerial vehicle and the first end of the inflatable tube is rigidly connected to the housing.

In accordance with yet another aspect of the present disclosure, the housing includes a first base component (e.g., an interior base component) and a second base component (e.g., an exterior base component), the first base component is sized and shaped to fit inside the second base component and to provide a friction fit with the first end of the inflatable tube between the first and second base components. In some implementations, the first base component includes an aperture sized and shaped to provide fluid communication between the means for inflating and the inflatable tube.

In accordance with one aspect of the present disclosure, the inflatable tube is structured to maintain pressurization after the inflatable tube is fully inflated to become a rigid member.

In accordance with another aspect of the present disclosure, the system includes a plurality of support straps, each support strap having a first end that connects to the inflatable tube and a second end that connects to the aerial vehicle, the plurality of support straps are taut in response to full inflation of the inflatable tube.

In accordance with yet another aspect of the present disclosure, the system includes an enclosure that fits inside the housing and connects to the second end of the inflatable tube. The enclosure is structured to encase the parachute, to extend away from the aerial vehicle with the second end of the inflatable tube in response to inflation of the inflatable tube, and to release the parachute in response to extension of the inflatable tube.

In accordance with one aspect of the present disclosure, the second end of the inflatable tube is structured to be invaginated on itself to form a pocket to hold the parachute in its folded state.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings. In the drawings, like reference numerals refer to like parts throughout the various figures unless otherwise specified. Many of the drawings are not drawn to scale, but are shown as illustrative examples of the present disclosure.

FIGS. 2A-2B illustrate the stages of deployment of a parachute from the descent-restraint system in accordance with the present disclosure;

DETAILED DESCRIPTION

Figure 1:
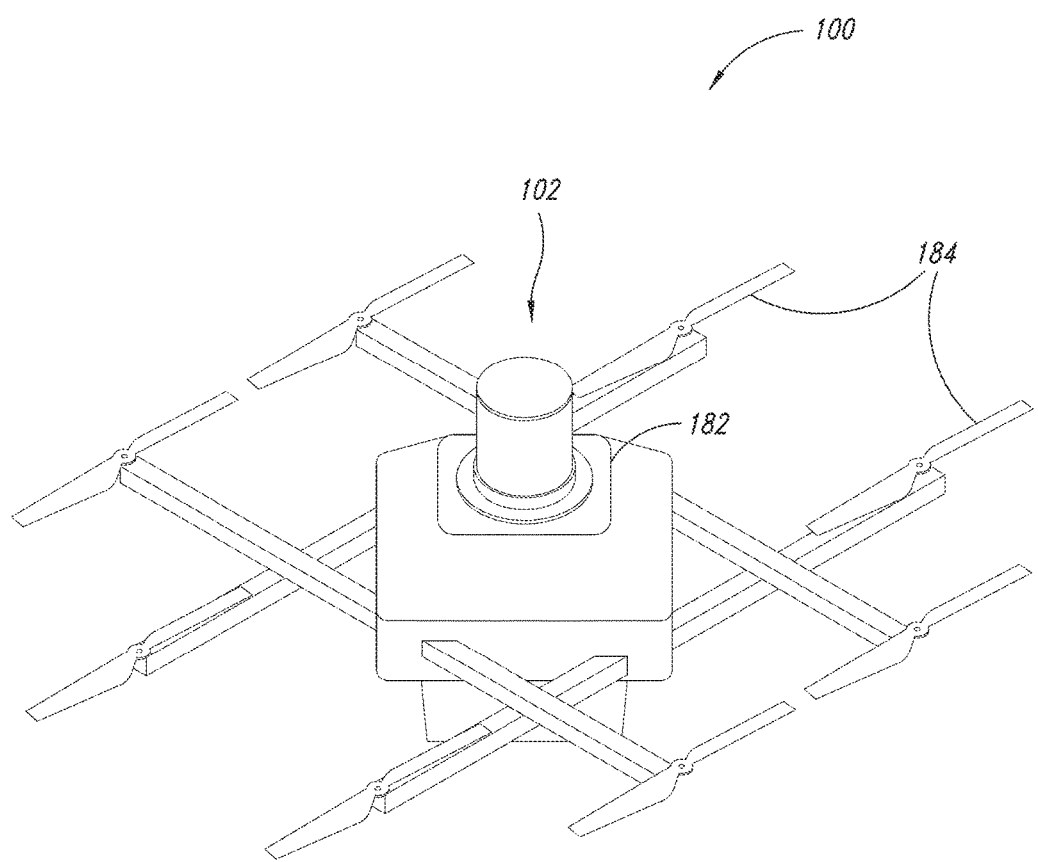
FIG. 1 illustrates a descent-restraint system attached to an aerial vehicle in accordance with the present disclosure.

In the following description, certain specific details are set forth in order to provide a thorough understanding of various disclosed implementations. However, one skilled in the relevant art will recognize that the present disclosed implementations may be practiced without one or more of these specific details or with other methods, components, materials, etc. In other instances, well-known structures or components or both that are associated with the environment of the present disclosure have not been shown or described in order to avoid unnecessarily obscuring descriptions of the implementations.

Unless the context requires otherwise, throughout the specification and claims that follow, the word "comprise" and variations thereof, such as "comprises" and "comprising," are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation.

As used herein, the term "aerial vehicle" refers to a powered airborne object controlled by a user or autonomously, such as through an automated position-control system. Aerial vehicles may be fixed-wing or single- or multi-rotor vehicles. For simplicity, the term rotor used herein includes any combination of rotary wings, blades, propellers, or other rotating airfoils. Examples of aerial vehicles can include, but are not limited to, unmanned aerial vehicles, drones, manned aerial vehicles, or the like.

Reference throughout this description to a "decelerator" or an "aerodynamic decelerator" refers to a device that utilizes properties and characteristics of air to create drag or resistance (sometimes referred to as aerodynamic drag) to slow a descent of an aerial vehicle (whether controlled or uncontrolled). Examples of aerodynamic decelerators include fabric parachutes, inflatable parachutes, hybrid fabric and inflatable parachutes, or other devices that utilize air to create drag and reduce a velocity of an aerial vehicle.

Reference throughout this description to a "tube," "inflatable apparatus," "deployment tube," and "inflatable tube" means a lightweight, flexible, hollow body that can be inflated with a gas or other fluid to create a semi-rigid structure that extends from a descent-restraint system attached to an aerial vehicle. The deployment tube may be cylindrical, hyperrectangular, or other n-orthotopes, with a length that is longer than its width. As described in more detail herein, the deployment tube is stored in an uninflated state in a housing of the descent-restraint system on the aerial vehicle. One end of the deployment tube is affixed to the housing and is in fluid communication with an inflation mechanism. The other end of the deployment tube is not connected to the housing but is closed and connected to an aerodynamic decelerator (e.g., a parachute).

In some implementations, the width (or diameter) of the deployment tube may be consistent along the length of the tube. In other implementations, the width (or diameter) of the deployment tube may vary along the length of the tube. For example, in some implementations described herein, the aerodynamic decelerator, in a folded state, is positioned into an introverted or invaginated portion of the end the deployment tube that connects to the aerodynamic decelerator. In some instances, however, the folded aerodynamic decelerator may be wider than the diameter of the deployment tube, such as if the deployment tube is made with a smaller diameter to save weight. Accordingly, the introverted or invaginated portion of the deployment tube may be flared out and have a diameter that is larger than the diameter of the other end of the tube that is attached to the housing of the descent-restraint system. This wider or flared-out portion of the deployment tube can allow for the folded aerodynamic decelerator to be at least partially encased in the invaginated portion of the deployment tube. By having a flared end, the remainder of the length of the deployment tube can be a diameter that is smaller than the width of the folded aerodynamic decelerator, which can save weight and space.

In various implementations, the deployment tube is made out of SPECTRA®, DYNEEMA®, CUBEN FIBER®, ZYLON®, ABC-Matrix, nanocellulose, KEVLAR®, or other ultra-high-molecular-weight polyethylene fibers, composites, or fiber-reinforced laminates. It should be recognized that other flexible materials may also be used as the deployment tube.

The following is a brief description of the use, operation, and purpose of the descent-restraint system described herein. As the use of drones and other small aerial vehicles increases, so too does the risk of inflight failures. Failures can occur in all different types of situations, environments, and vehicle altitudes and speeds. And the use of aerial vehicles in urban areas has increased the desire for a system to allow an aerial vehicle that experiences an inflight failure to land without causing harm to people, animals, homes, or other property. Similarly, aerial vehicle owners would like a system that reduces the risk of damage to the aerial vehicle or components attached to the aerial vehicle (e.g., cameras or payloads) due to a fall from altitude.

The descent-restraint system described herein accompanies or is a component of a vehicle safety system. Generally, the vehicle safety system includes a detection computer system, sensors, an inflation mechanism or device, and the descent-restraint system. This system is part of, embedded in, or otherwise attached to an aerial vehicle. In some implementations, the vehicle safety system may be integrated into the aerial vehicle during manufacturing. In other implementations, one or more components of the vehicle safety system may be after-market components that can be added to the aerial vehicle after it is purchased by a user. For example, the aerial vehicle may be manufactured with the detection computer system and sensors, but the descent-restraint system and inflation mechanism can be attached to the aerial vehicle after it is purchased. Similarly, in some implementations, the inflation mechanism may be part of the descent-restraint system.

The detection computer system, or control circuitry, is operable to detect an uncontrolled flight condition of the aerial vehicle and to output a signal in response to the detected condition. These detection systems utilize different types of sensors, such as gyroscopes, accelerometers, altimeters, Global Positioning System (GPS) systems, or the like, and algorithms to detect if the aerial vehicle has gone into an uncontrolled condition. An uncontrolled condition may be an uncontrolled descent, an unintentional unpowered descent, other uncontrolled movements, flight of the aerial vehicle into an unapproved or unauthorized location or altitude, etc.

Examples of an uncontrolled flight condition may be that the motor(s) of the aerial vehicle loses power—resulting in a loss of lift to the aerial vehicle. Another uncontrolled flight condition may be that the aerial vehicle stops responding to operating commands from a remote control of a user. In yet another example, the aerial vehicle may be too close to the ground or near structures or is on a collision course with a structure, person, or other aerial vehicle. It should be recognized that other uncontrolled or potentially hazardous flight conditions also may be detected by the detection computer system.

Upon detection of an uncontrolled flight condition, the detection computer system outputs a signal that can be used for a variety of different safety measures. For example, the signal can bypass the avionics controller and cut power to the motors, which stops the motors and the attached rotors or propellers from spinning. The signal is also received by a controller of the inflation mechanism and is configured to initiate deployment of a parachute or other aerodynamic decelerator from the descent-restraint system, as described herein. In some implementations, users can manually input, such as from a remote control, the detection signal to initiate deployment of the aerodynamic decelerator from the descent-restraint system.

Upon receiving the fall detection signal, a servo or other controller opens or otherwise activates the inflation mechanism—which is in fluid communication with a deployment tube of the descent-restraint system—to inflate the deployment tube, and thus deploy the aerodynamic decelerator from a housing of the descent-restraint system. As described elsewhere herein, the inflation mechanism may be compressed air, a pump, a solid-propellant inflator, other explosion- or chemical-based inflators, etc. Also, the aerodynamic decelerator may be a parachute or other device designed to create aerodynamic drag to reduce a velocity of an aerial vehicle.

Prior to operation of an aerial vehicle, the descent-restraint system is attached to the aerial vehicle (e.g., to the frame of the aerial vehicle). The descent-restraint system primarily includes a housing, a deployment tube, and an aerodynamic decelerator (e.g., a parachute). The deployment tube is stored in an uninflated state, along with the aerodynamic decelerator in a folded state, in the housing. As described herein, the deployment tube may be made of any of a variety of different lightweight materials that are capable of holding air pressure while the deployment tube is inflated. In some implementations, the deployment tube is a closed assembly so that once inflated and pressurized it remains in a semi-solid or semi-rigid state for a suitable amount of time to allow the aerial vehicle to descend and come to rest on the ground. In other implementations, the deployment tube is a partially closed assembly that enables the deployment tube to inflate to its full length, but then does not maintain a pressurized form.

Upon initiation of deployment, an initial burst of gas from the inflation mechanism begins to inflate the deployment tube. As described elsewhere herein, the process of inflating the deployment tube extends the deployment tube along a length of the deployment tube, which pushes the aerodynamic decelerator in its folded state out of the housing and away from aerial vehicle. This burst of gas likewise pushes the aerial vehicle in an opposite direction of the deployment of the aerodynamic decelerator, which helps to create some distance between the aerial vehicle and the aerodynamic decelerator. As the deployment tube approaches or reaches a fully inflated state, the aerodynamic decelerator is deployed away from the deployment tube and transitions from its folded state into a deployed or open state, which creates drag to reduce a velocity of the aerial vehicle.

The inflation and pressurization of the of the deployment tube forces the aerodynamic decelerator away from and clear of the aerial vehicle prior to the aerodynamic decelerator opening and deploying to create drag and reduce a velocity of the aerial vehicle. This type of deployment reduces the likelihood of the aerodynamic decelerator getting entangled with the rotors, wings, flaps, or other parts of the aerial vehicle, which could otherwise impact the operation and efficiency of the aerodynamic decelerator. In some implementations, the aerodynamic decelerator may at least partially begin to deploy as the deployment tube is being inflated, but to the extent that inflation of the inflatable tube keeps the aerodynamic decelerator away from and clear of the aerial vehicle.

FIG. 1 illustrates a descent-restraint system 102 attached to an aerial vehicle 100 in accordance with the present disclosure. The aerial vehicle includes an airframe 182, rotors 184, and other components (not illustrated for ease of description). The descent-restraint system 102 is connected to or otherwise physically attached to the airframe 182. The descent-restraint system 102 is attached to the airframe 182 in a location that allows the descent-restraint system to operate without interference from the rotors 184 or other components of the aerial vehicle 100.

In various implementations, the descent-restraint system 102 is attached to the aerial vehicle 100 at the aerial vehicle's center of gravity. As illustrated in FIG. 1, the descent-restraint system 102 is attached to a top central area of the airframe 182 and positioned such that the deployment tube and aerodynamic decelerator (not illustrated, see FIG. 3) extend and deploy up and away from the airframe 182 of the aerial vehicle 100. However, in other implementations, the descent-restraint system 102 may be attached to the airframe 182 in other locations. For example, in one implementation where the aerial vehicle is a fixed-aerial vehicle, the descent-restraint system 102 is attached to the airframe above the fuselage between the wings; see, e.g., FIG. 3D. In other implementations, such as where the aerial vehicle is a single-rotor aerial vehicle, the descent-restraint system 102 may be attached to the aft of the airframe 182 and positioned such that the deployment tube and the aerodynamic decelerator extend and deploy aft of the aerial vehicle 100; see, e.g., FIG. 3C.

Figure 2B:
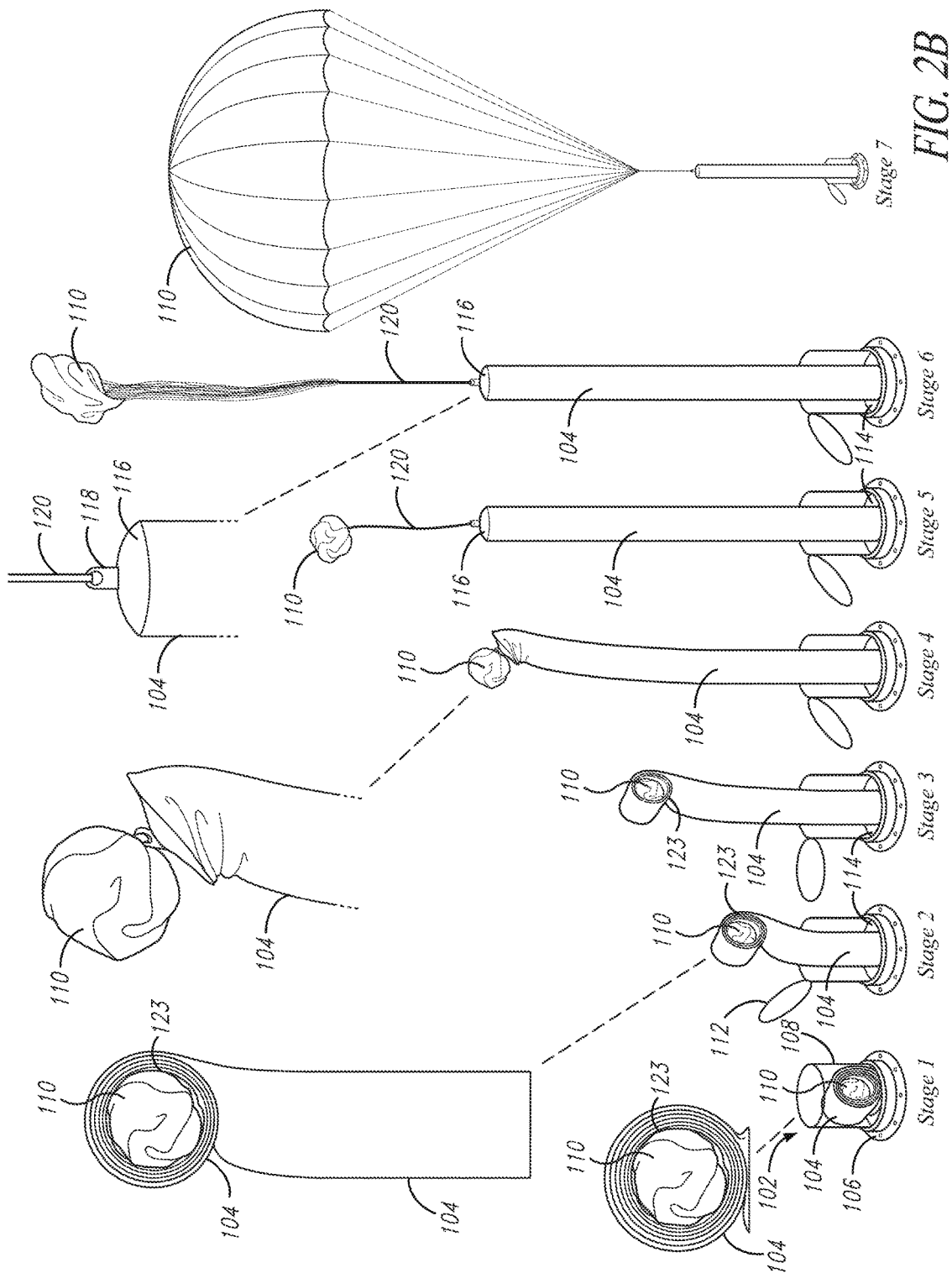

FIGS. 2A-2B illustrate the stages of deployment of an aerodynamic decelerator 110 from the descent-restraint system 102 in accordance with the present disclosure. In this illustration, the aerodynamic decelerator 110 is a parachute, but other aerodynamic decelerators may be utilized in other implementations.

In particular, FIG. 2A illustrates a compressed-accordion packing and deployment of the aerodynamic decelerator 110. As described in more detail herein, the descent-restraint system 102 includes a housing 108 and a connector base 106. The connector base 106 is structured to rigidly attach the housing 108 and the rest of the descent-restraint system 102 to an aerial vehicle 100. The housing 108 is a hollow body that is structured to store the aerodynamic decelerator 110 in a folded state and a deployment tube 104 in an uninflated state. In various implementations, the connector base 106 is part of the housing 108 to form a single unit. In other implementations, the housing 108 is removably connected to the connector base 106 to allow a user to remove the housing 108 after deployment of the aerodynamic decelerator 110 and attach a new housing 108 (with a newly folded aerodynamic decelerator and uninflated deployment tube stored therein) to the connector base 106.

This figure illustrates 7 stages of the inflation of the deployment tube 104 and the deployment of the aerodynamic decelerator 110 from a compressed-accordion packing configuration. It should be understood that these stages are for illustrative purposes only and represent snapshots of the inflation and deployment process. Also, the aerial vehicle is not illustrated in this figure for ease of illustrating the deployment process.

In stage 1, the aerodynamic decelerator 110 (in a folded state) and the deployment tube 104 (in an uninflated state) are stored in the housing 108. This stage is considered the in-flight stage where the aerial vehicle is operating normally. A first end 114 of the deployment tube 104 is connected to the housing 108, which is described in more detail herein. Briefly, however, the first end 114 of the deployment tube 104 may be connected to the housing 108 via a friction fit, locking ring and compression fit, adhesive, hose clamp, welded, or other attachment mechanism. The first end 114 of the deployment tube 104 is in fluid communication with an inflation mechanism (not illustrated). A second end 116 of the deployment tube 104 is introverted or invaginated into itself to form a cavity 122 that at least partially encases the folded aerodynamic decelerator 110. In some implementations, the deployment tube 104 may be completely invaginated into itself such that the second end 116 is positioned at the first end 114, or it may be partially invaginated into itself but still far enough to encase the folded aerodynamic decelerator 110.

Stage 2 begins in response to a detected uncontrolled flight condition (e.g., loss of power or loss of control of the aerial vehicle 100). The inflation mechanism (not illustrated) that is in fluid communication with the first end 114 of the deployment tube 104 begins to inflate the deployment tube 104. This initial deployment opens a housing door 112 that is positioned on the housing 108 opposite of the connector base 106. The housing door 112 is structured to open to allow the second end 116 of the deployment tube 104 and the aerodynamic decelerator 110 to exit the housing as the deployment tube 104 is inflated. In some implementations, the deployment tube 104 pushes the housing door 112 open as it inflates. In other implementations, the housing door 112 may be attached to a motor or other mechanism that mechanically opens the housing door 112 independent of the inflation of the deployment tube 104.

In some implementations, the housing door 112 may be on a hinge that is connected to the housing 108 and opens to one side of the housing 108, as illustrated. In other implementations, the housing door 112 may include multiple portions that are each connected to the housing 108 and are structured to open like a flower. In yet other implementations, the housing door 112 may be structured to completely detach from the housing 108 when inflation of the deployment tube 104 begins.

Stages 3 and 4: as the deployment tube 104 is inflated, the deployment tube 104 unravels or uncompresses and begins to extend the second end 116 of the deployment tube 104 away from the housing 108. The inflation of the deployment tube also begins to undo the introverted or invaginated cavity 122, which pushes the folded aerodynamic decelerator 110 out of and away from the housing 108. The more the deployment tube 104 inflates, the further it pushes the cavity 122 and the folded aerodynamic decelerator 110 away from the housing 108, and thus pushing the aerodynamic decelerator 110 away from and clear of the aerial vehicle. As can be seen in the illustration, the folded aerodynamic decelerator 110 remains in the invaginated cavity 122 throughout the inflation process of the deployment tube 104.

Stages 5 and 6: once the deployment tube 104 is nearly fully inflated, the invaginated cavity 122 becomes smaller and begins to push the folded aerodynamic decelerator 110 out of the cavity 122. The deployment tube 104 continues to inflate until the aerodynamic decelerator 110 completely leaves the cavity 122 and the deployment tube 104 is in an inflated state without an introverted or invaginated cavity 122, which releases the aerodynamic decelerator 110 free from the deployment tube 104.

A lead line 120 of the aerodynamic decelerator 110 remains attached to the second end 116 of the deployment tube 104, such as via grommet 118. In this way the aerodynamic decelerator 110 is connected to the aerial vehicle 100 via the connector base 106, the housing 108, and the deployment tube 104. Although only a single lead line 120 is illustrated, other implementations may include a plurality of lead lines from the deployment tube 104 to the aerodynamic decelerator 110.

Stage 7: once the aerodynamic decelerator 110 is free from the deployment tube 104, the aerodynamic decelerator 110 deploys and unfolds or opens to create drag and thus reduce a velocity of the aerial vehicle. In some situations where the deployment tube 104 is inflated at a relatively high rate, the unraveling of the deployment tube 104 and collapse of the cavity 122 as the deployment tube 104 turns into its inflated state may effectively launch the folded aerodynamic decelerator 110 out of the cavity 122 and away from the deployment tube 104, thus providing further distance between the aerial vehicle and the aerodynamic decelerator 110 when the aerodynamic decelerator 110 finally begins to unfold and open.

In some implementations, the deployment tube 104 maintains air pressurization after the deployment tube 104 is fully inflated, which creates a rigid or semi-rigid member between the aerial vehicle and the aerodynamic decelerator 110. The rigidity of the deployment tube 104 may maintain stability of the aerial vehicle as it returns to the ground, which can reduce damage to the aerial vehicle when the aerial vehicle hits the ground.

FIG. 2B illustrates a rolled packing and deployment of the aerodynamic decelerator 110. The components of the descent-restraint system 102 illustrated in FIG. 2B are the same as illustrated above in FIG. 2A, but that the folded aerodynamic decelerator 110 and the deployment tube 104 may be stored in the housing 108 in a different configuration than what is illustrated in FIG. 2A.

As described above and in more detail herein, the descent-restraint system 102 includes a housing 108 and a connector base 106. The connector base 106 is structured to rigidly attach the housing 108 and the rest of the descent-restraint system 102 to an aerial vehicle 100. The housing 108 is a hollow body that is structured to store the aerodynamic decelerator 110 in a folded state and a deployment tube 104 in an uninflated state.

This figure illustrates 7 stages of the inflation of the deployment tube 104 and the deployment of the aerodynamic decelerator 110 from a rolled packing configuration. It should be understood that these stages are for illustrative purposes only and represent snapshots of the inflation and deployment process. Also, the aerial vehicle is not illustrated in this figure for ease of illustrating the deployment process.

In stage 1, the aerodynamic decelerator 110 (in a folded state) and the deployment tube 104 (in an uninflated state) are stored in the housing 108. This stage is considered the in-flight stage where the aerial vehicle is operating normally. A first end 114 of the deployment tube 104 is connected to the housing 108, which is described in more detail herein. The first end 114 of the deployment tube 104 is in fluid communication with an inflation mechanism (not illustrated). A second end 116 of the deployment tube 104 is attached to the aerodynamic decelerator 110. In this implementation, the deployment tube 104 is rolled up along its length so that the folded aerodynamic decelerator 110 and the second end 116 of the deployment tube are in a central cavity 123 created by rolling up the deployment tube 104.

Stage 2 begins in response to a detected uncontrolled flight condition (e.g., loss of power or loss of control of the aerial vehicle 100). The inflation mechanism (not illustrated) that is in fluid communication with the first end 114 of the deployment tube 104 begins to inflate the deployment tube 104. This initial deployment opens a housing door 112 and allows the second end 116 of the deployment tube 104 and the folded aerodynamic decelerator 110 to exit the housing as the deployment tube 104 is inflated. As described above, the housing door 112 may be opened by being pushed by the inflating deployment tube 104 or via another mechanical mechanism.

Stages 3 and 4: as the deployment tube 104 is inflated, the deployment tube 104 unrolls and begins to extend the cavity 123 and the second end 116 of the deployment tube 104 away from the housing 108. As the second end 116 of the deployment tube 104 is extended away from the housing 108, the folded aerodynamic decelerator 110 is also extended away from the housing 108. The more the deployment tube 104 inflates the more it unrolls and the further it pushes the cavity 123 and the folded aerodynamic decelerator 110 away from the housing 108, and thus pushing the folded aerodynamic decelerator 110 away from and clear of the aerial vehicle. As can be seen in the illustration, the aerodynamic decelerator 110 remains in the central cavity 123 throughout the inflation process of the deployment tube 104.

Stages 5 and 6: once the deployment tube 104 is nearly fully inflated and the last roll of the deployment tube 104 is unrolled, the central cavity 123 opens and releases the folded aerodynamic decelerator 110 free from the deployment tube 104. In some implementations, the folded aerodynamic decelerator 110 may be further attached to the deployment tube 104 via a quick release mechanism (e.g., a hook and loop strap) that separates when the deployment tube 104 is nearly (e.g., the last roll of the deployment tube 104) or fully inflated.

Stage 7: once the aerodynamic decelerator 110 is free from the deployment tube 104, the aerodynamic decelerator 110 deploys and opens to create drag and thus reduce a velocity of the aerial vehicle. In some situations where the deployment tube 104 is inflated at a relatively high rate, the unrolling of the deployment tube 104 just as the deployment tube 104 reaches its fully inflated state may effectively launch the aerodynamic decelerator 110 further away from the deployment tube 104, thus providing further distance between the aerial vehicle and the aerodynamic decelerator 110 when the aerodynamic decelerator 110 finally begins to unfold and open.

Similar to what is described above, a lead line 120 of the aerodynamic decelerator 110 is attached to the second end 116 of the deployment tube 104, such as via grommet 118, to provide a connection point with the deployment tube 104 and thus the aerial vehicle. Also, in some implementations, the deployment tube 104 maintains air pressurization after the deployment tube 104 is fully inflated, which creates a rigid or semi-rigid member between the aerial vehicle and the aerodynamic decelerator 110. The rigidity of the deployment tube 104 may maintain stability of the aerial vehicle as it returns to the ground, which can reduce damage to the aerial vehicle when the aerial vehicle hits the ground.

Although not illustrated, in some implementations, the folded aerodynamic decelerator 110 may be maintained or encased in a second housing (e.g., a bag) that opens when the deployment tube 104 is fully inflated. For example, with reference to FIG. 2A, the second housing may be structured to fit in the introverted or invaginated cavity 122. As the deployment tube 104 becomes fully inflated and the cavity 122 collapses (e.g., at stage 4), the second housing opens and releases the aerodynamic decelerator 110 from the deployment tube 104. Similarly, with reference to FIG. 2B, the second housing may be structured to fit in the rolled central cavity 123. As the deployment tube 104 unrolls and becomes fully inflated (e.g., at stage 4), the second housing opens and releases the aerodynamic decelerator 110 from the deployment tube 104. In some implementations, this second housing may open and release the aerodynamic decelerator 110 by being attached to the deployment tube 104 with a quick release mechanism (e.g., hook and loop straps) that tighten and release when the deployment tube 104 is sufficiently inflated.

Figure 3A:
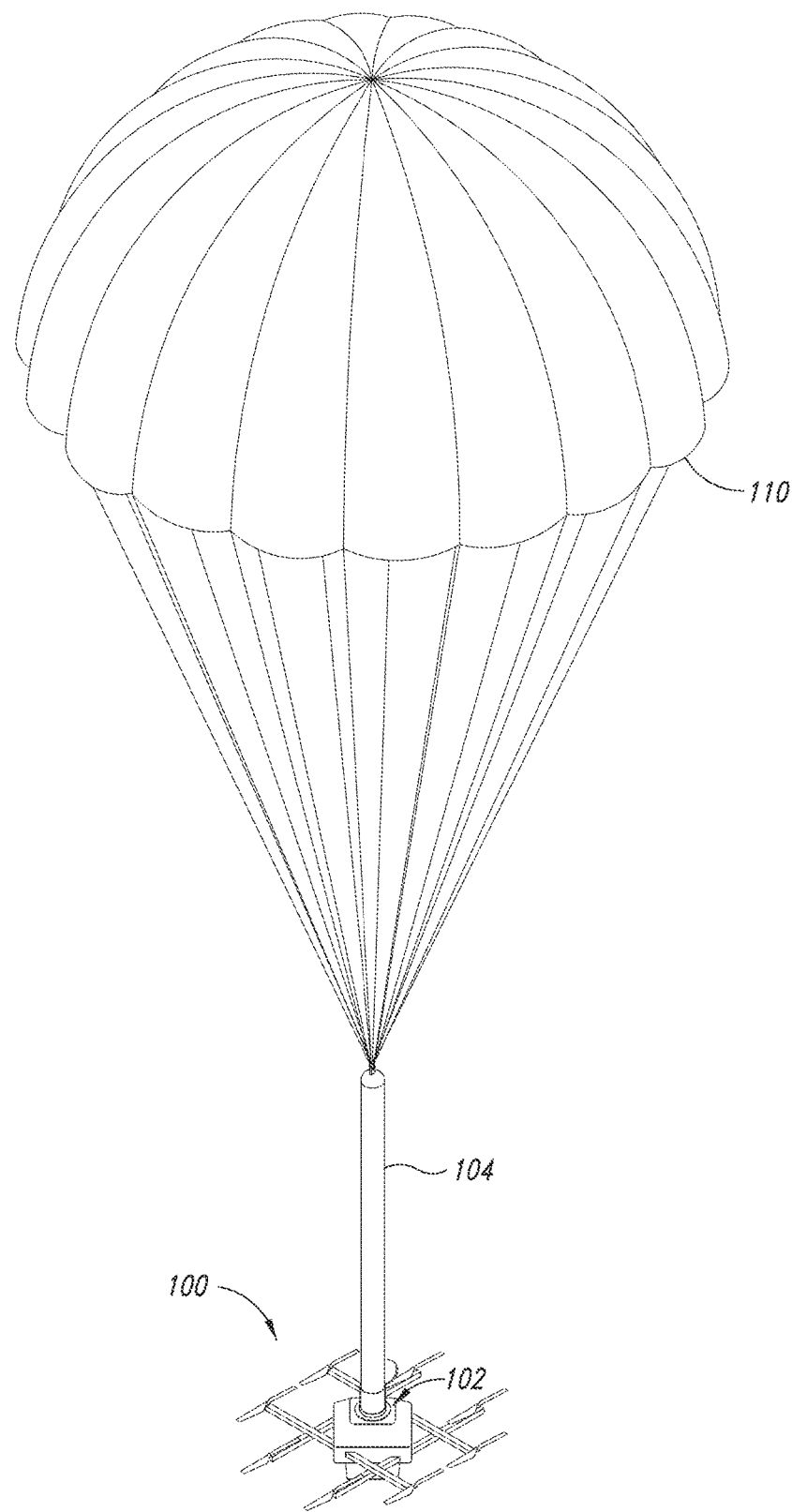
FIGS. 3A-3D illustrate examples of the fully deployed parachute and descent-restraint system attached to various different types of aerial vehicles in accordance with the present disclosure.
Figure 3B:
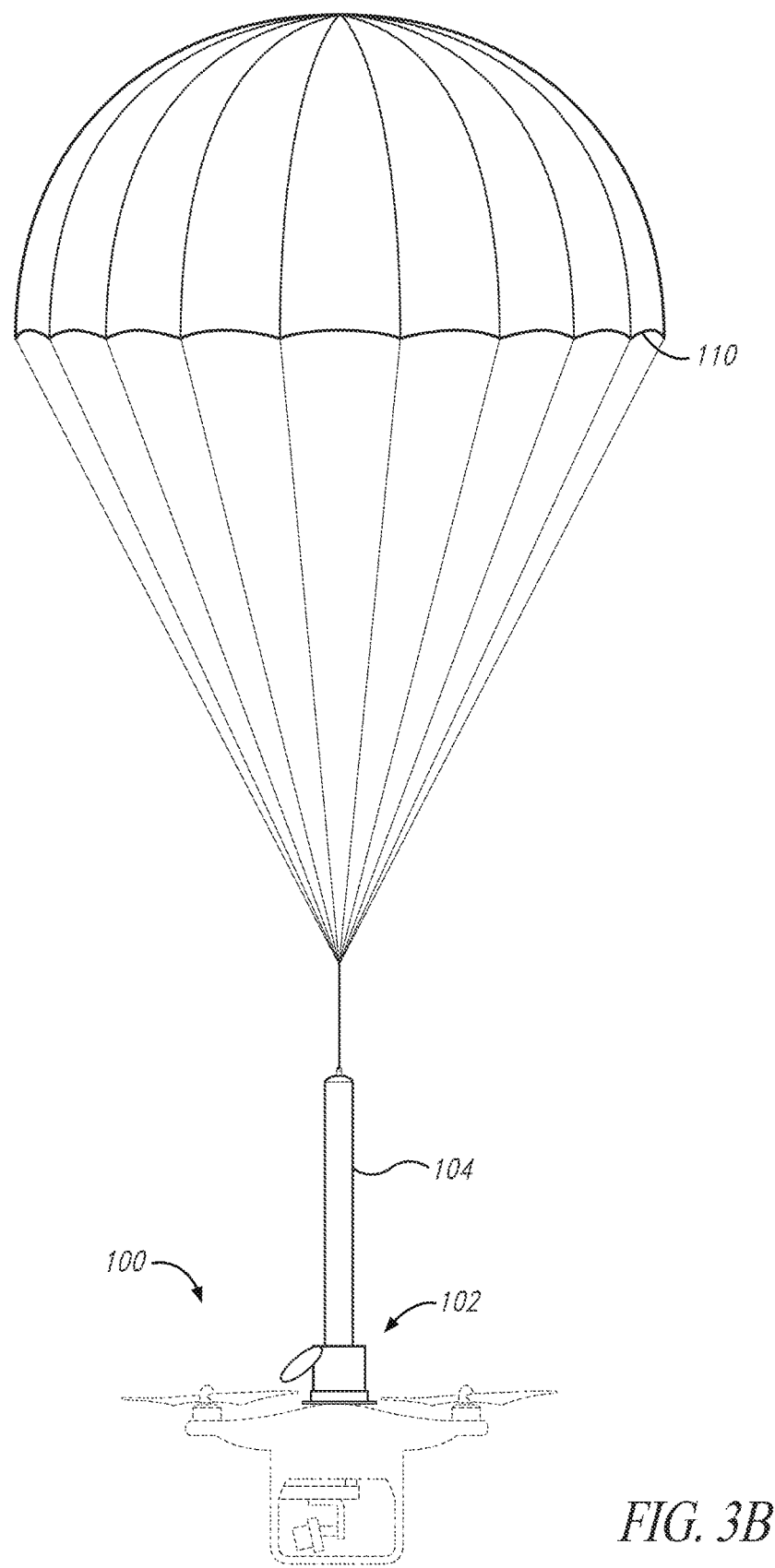
Figure 3C:
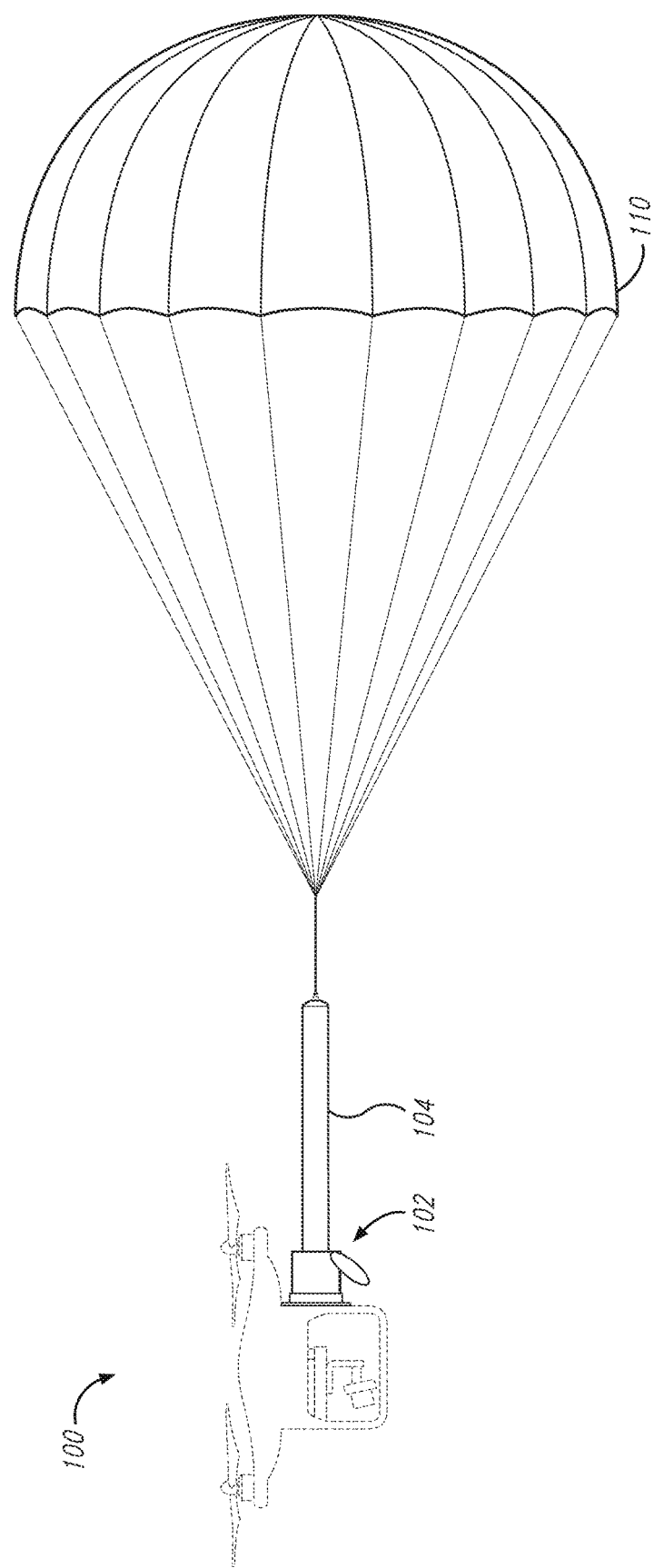
Figure 3D:
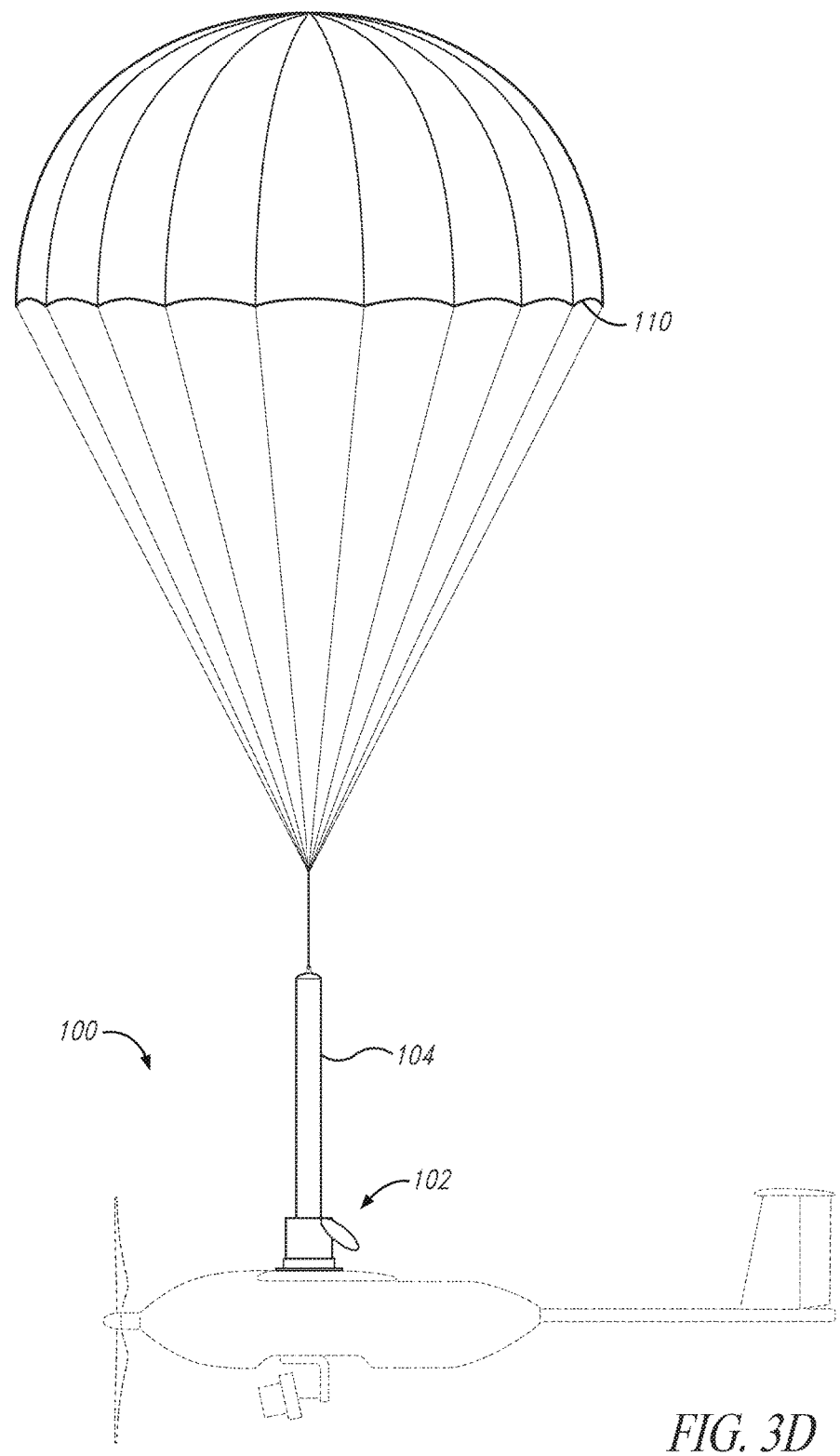

FIGS. 3A-3D illustrate various examples of the deployment tube 104 and the aerodynamic decelerator 110 being deployed from a descent-restraint system 102 attached to an aerial vehicle in accordance with the present disclosure. For example, FIGS. 3A and 3B illustrate the descent-restraint system 102 attached to a top of the aerial vehicle 100 so that the deployment tube 104 inflates up and away from the aerial vehicle 100 allowing the aerodynamic decelerator 110 to open above the aerial vehicle. FIG. 3C illustrates an alternative attachment location for the descent-restraint system 102. In this illustration, the descent-restraint system 102 is attached to an aft portion of the airframe of the aerial vehicle 100 so that the deployment tube 104 inflates aft and away from the aerial vehicle 100 allowing the aerodynamic decelerator 110 to open behind the aerial vehicle. FIG. 3D illustrates yet another alternative attachment location for the descent-restraint system 102. In this illustration, the descent-restraint system 102 is attached to a top of the airframe between the fixed wings of the aerial vehicle.

Figure 4:
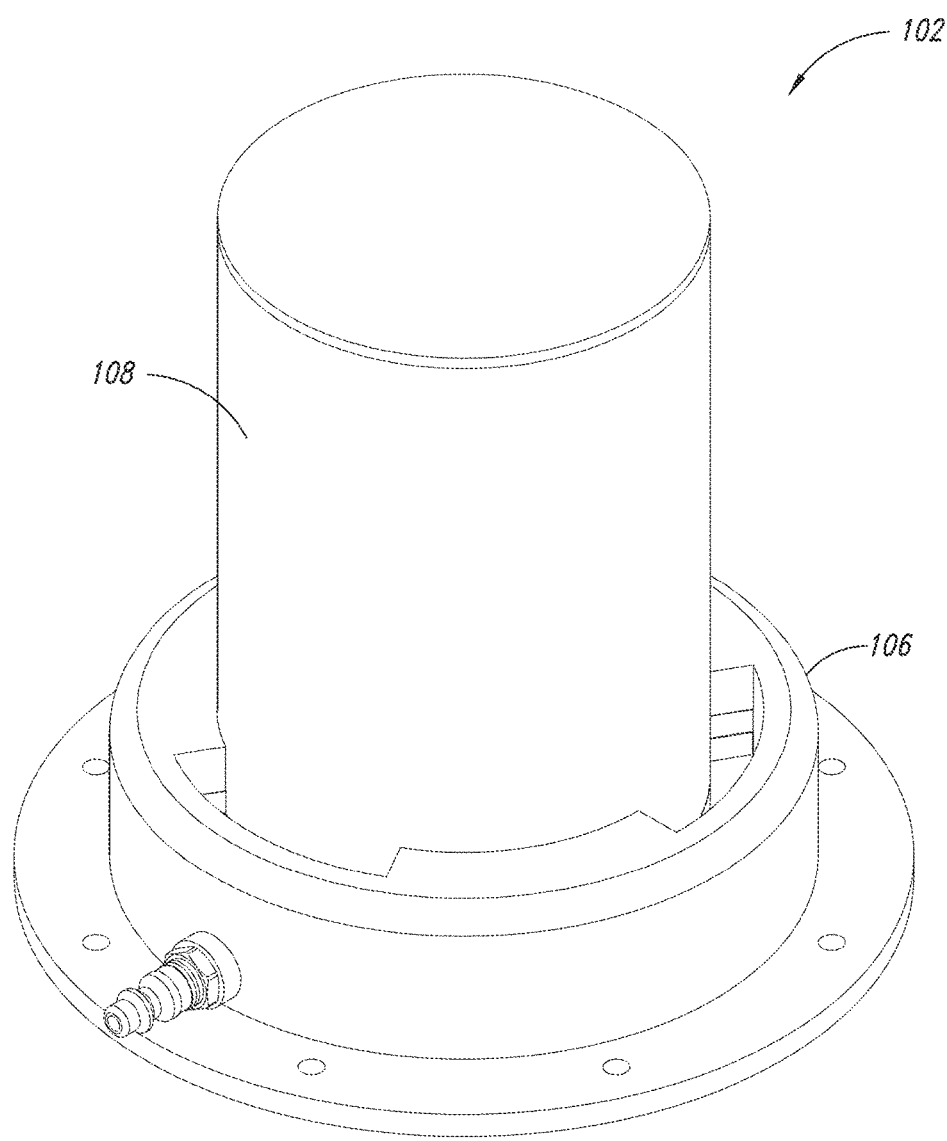
FIG. 4 is a perspective view of one implementation of the descent-restraint system in accordance with the present disclosure.

FIG. 4 is a perspective view of one implementation of the descent-restraint system 102 in accordance with the present disclosure. As described in more detail in the following figures, the descent-restraint system 102 includes a housing 108 and a connector base 106. In this implementation, the housing 108 is removably coupled to the connector base 106. This connection allows for the housing 108 to be rigidly connected to the connector base 106 (and thus the aerial vehicle) while allowing for a user to remove the housing 108 without having to detach the connector base 106 from the aerial vehicle. This descent-restraint system 102 may utilize one of the packing and deployment processes described above in conjunction with FIGS. 2A and 2B, or it may utilize another packing and deployment process.

Figure 5A:
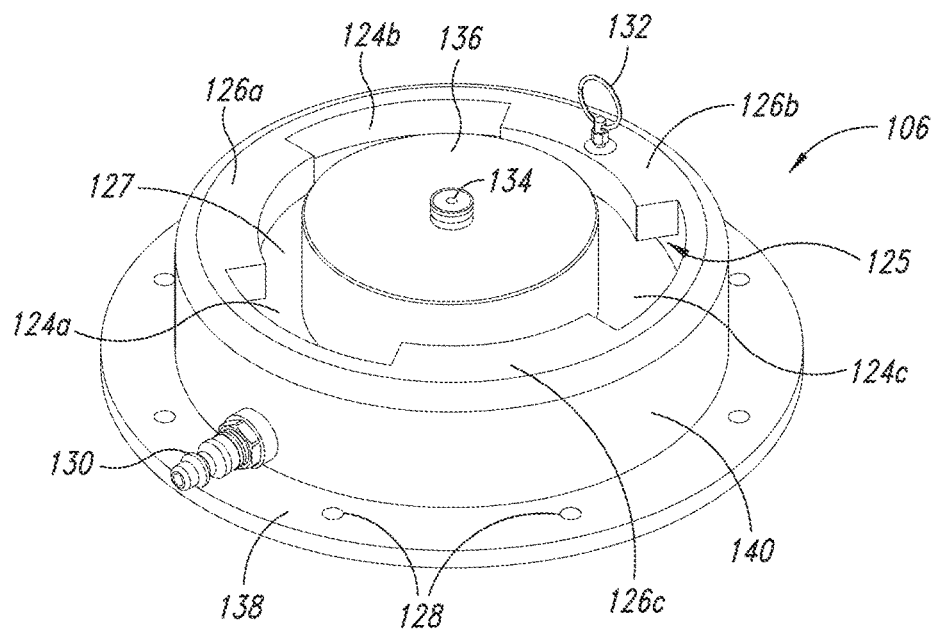
FIGS. 5A-5D are various views of the connector base of the descent-restraint system illustrated in FIG. 4 in accordance with the present disclosure.
Figure 5B:
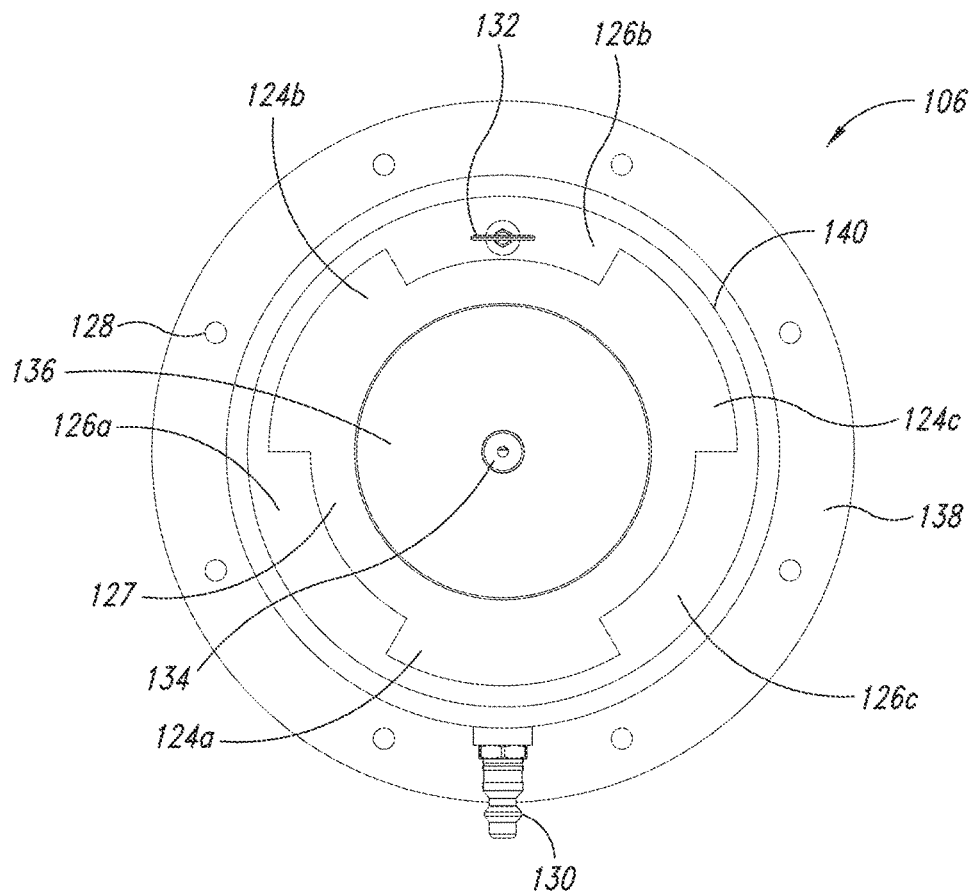
Figure 5C:
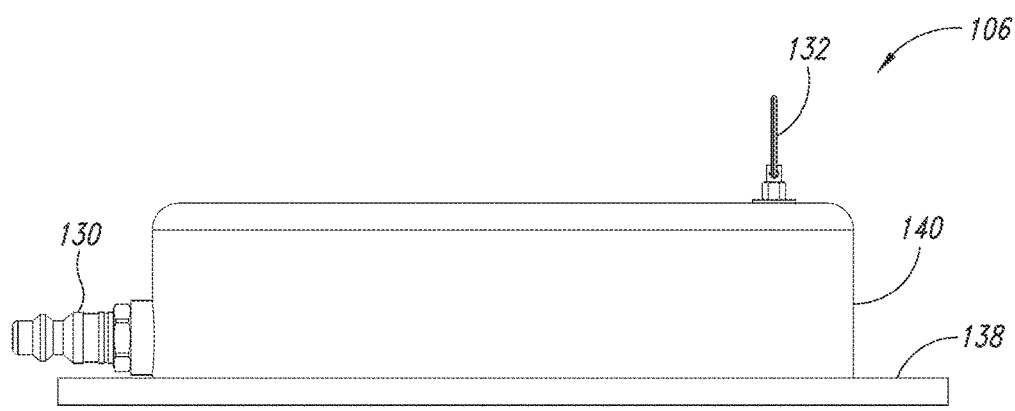
Figure 5D:
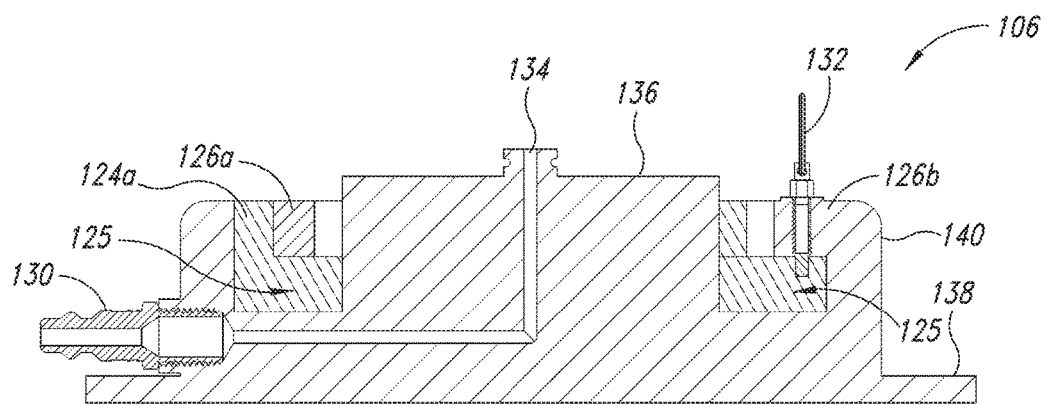

FIGS. 5A-5D are various views of the connector base 106 of the descent-restraint system 102 in accordance with the present disclosure. Briefly, FIG. 5A is a perspective view of the connector base 106, FIG. 5B is a top view of the connector base 106, FIG. 5C is a side view of the connector base 106, and FIG. 5D is a cross-section side view of the connector base 106.

The connector base 106 includes a bracket 138, a seat 136, and a ring 140 that are on a same central axis. In the illustrated implementation, the bracket 138, the seat 136, and the ring 140 are circular; however, in other implementations, these components may be square, rectangular, or other polygonal shapes, and may be the same or different shapes from one another.

The bracket 138 is structured to mount or attach the connector base 106 to an aerial vehicle 100. As illustrated, the bracket 138 includes a plurality of connector apertures 128 that are distributed radially around a center near an outer edge of the bracket 138. The connector apertures 128 are structured and sized to allow a screw, bolt, or other connector to attach the connector base 106 to the aerial vehicle. It should be recognized that other connection mechanisms may also be employed to connect the connector base 106 to the aerial vehicle, including, but not limited to, adhesives, clamps, welds, or other bonding methods or mechanisms.

The seat 136 has a diameter that is smaller than a diameter of the deployment tube (not illustrated), as described in more detail herein. The seat 136 includes an output port 134 that is in fluid communication with an input port 130 to enable air or other fluid to flow from an inflation mechanism and into the deployment tube as described herein.

The ring 140 has an outer diameter that is smaller than the diameter of the bracket 138 and an internal diameter that is larger than the diameter of the seat 136. In one implementation, the ring 140 is sized to not cover the connector apertures 128. In various implementations, the ring 140 includes the input port 130 to enable the output port 134 to be in fluid communication with the inflation mechanism. It should be recognized that the input port 130 may be positioned elsewhere on the connector base so long as it provides for fluid communication between the inflation mechanism and the output port 134 to the deployment tube.

The ring 140 includes a plurality of tabs 126a-126c that each extends inward towards the seat 136 to create a channel 127 and a locking groove 125. The tabs 126 are positioned radially around the ring 140 to create a plurality of slots 124a-124c. The channel 127, the tabs 126, and the slots 124 are sized and shaped so that flanges on the housing traverse through the slots 124 and enable the housing be positioned around the seat 136 and into the ring 140 on the connector base 106, which is described in more detail below. Moreover, the slots 124 and the tabs 126 are structured and sized to enable the flanges of the housing to slide under the tabs 126 in the locking groove 125 in response to rotation of the housing on the central axis with the connector base 106, as described in more detail below.

In some implementations, the tab 126b includes a lock 132. In the illustrated implementation, the lock 132 is a spring-loaded pin that engages a locking aperture in a flange of the housing, as further described elsewhere herein, including FIG. 8E. It should be recognized that other types of locking mechanisms may be employed to prevent the housing from rotating once the flanges on the housing are under the tabs 126 of the connector base 106, as described herein.

In the illustrated implementations, the tabs 126 are evenly sized and evenly spaced so that the slots 124 are evenly sized and evenly spaced. However, in other implementations, one or more tabs 126 or one or more slots 124 may be size or shaped differently from the other tabs 126 or other slots 124. Likewise, although the figures illustrate three tabs 126 and three slots 124, in other implementations, other numbers of tabs 126 and slots 124 may be utilized.

Figure 6:
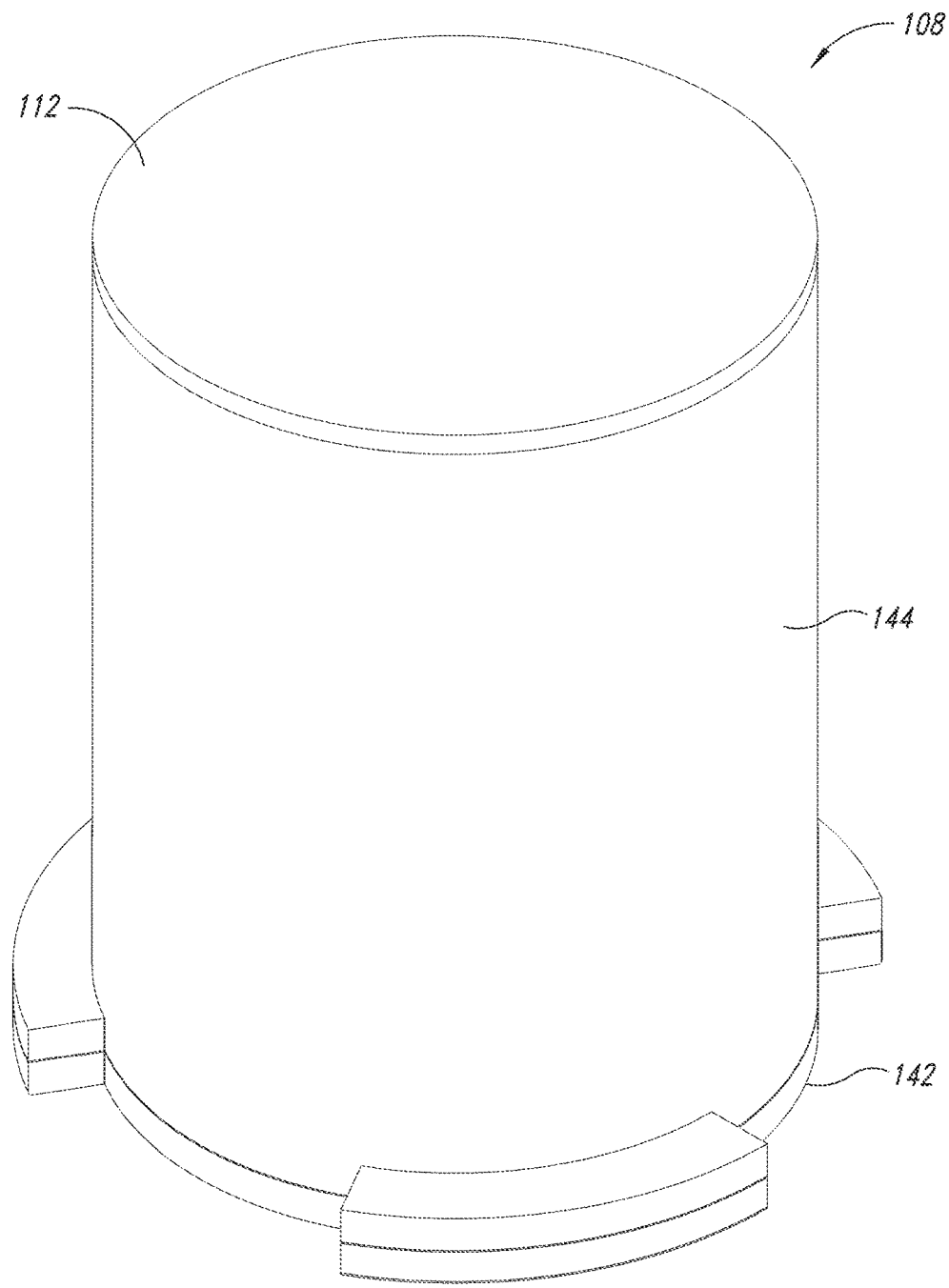
FIG. 6 is a perspective view of one implementation of a housing of the descent-restraint system illustrated in FIG. 4 in accordance with the present disclosure.

FIG. 6 is a perspective view of one implementation of the housing 108 of the descent-restraint system 102 in accordance with the present disclosure. In this implementation, the housing 108 includes a housing door 112, an interior base 142, and an exterior base 144. The housing door 112 is structured and sized to enclose the housing 108 and enable the deployment tube and the aerodynamic decelerator 110 to extend away from the descent-restraint system 102 and the aerial vehicle in response to initiation of deployment of the aerodynamic decelerator 110. The interior base 142 and the exterior base 144 are structured and sized to secure the deployment tube to the housing 108 and to removably attach the housing 108 to the connector base 106. The interior base 142 is described in more detail below in conjunction with FIGS. 7A-7E and the exterior base 144 is described in more detail below in conjunction with FIGS. 8A-8F.

Figure 7A:
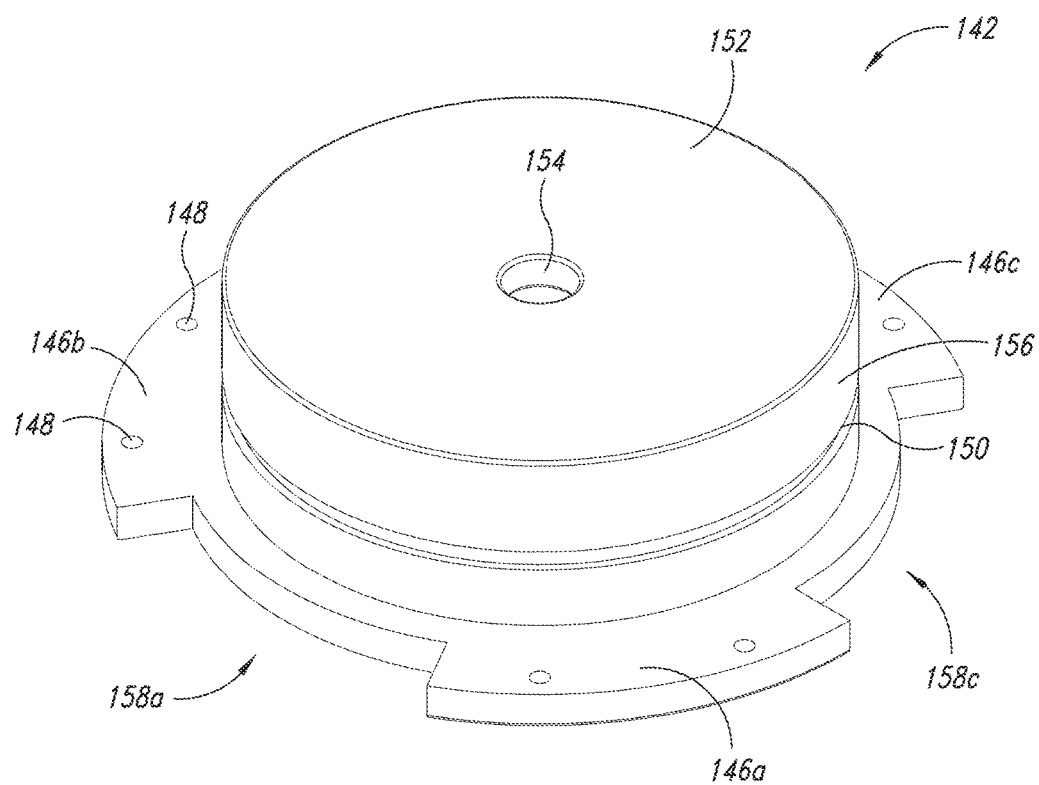
FIGS. 7A-7E are various views of an interior base of the housing illustrated in FIG. 6 in accordance with the present disclosure.
Figure 7B:
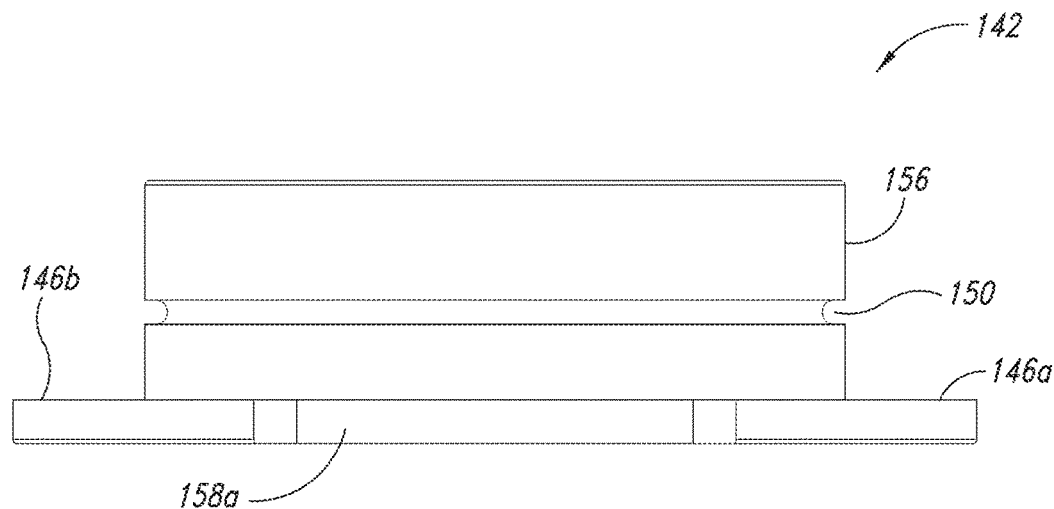
Figure 7C:
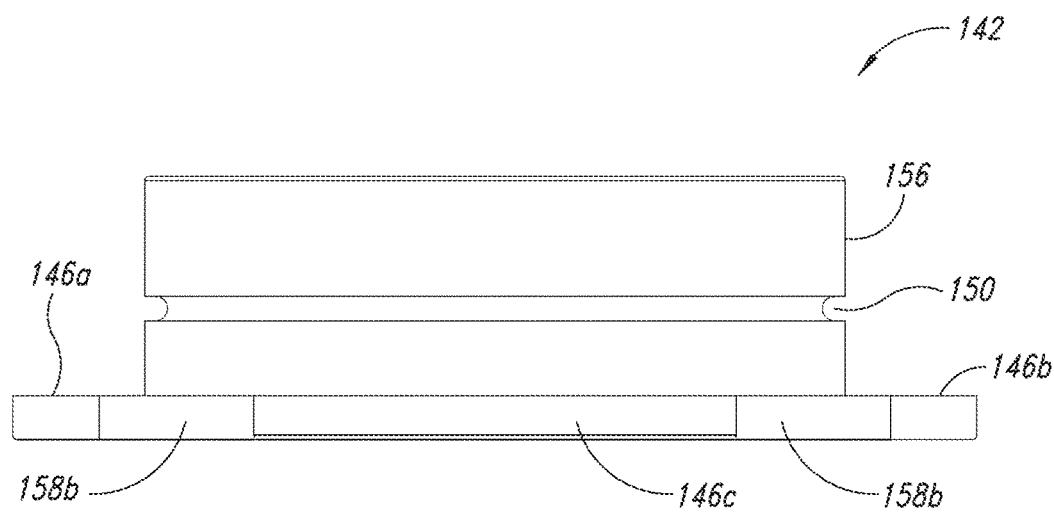
Figure 7D:
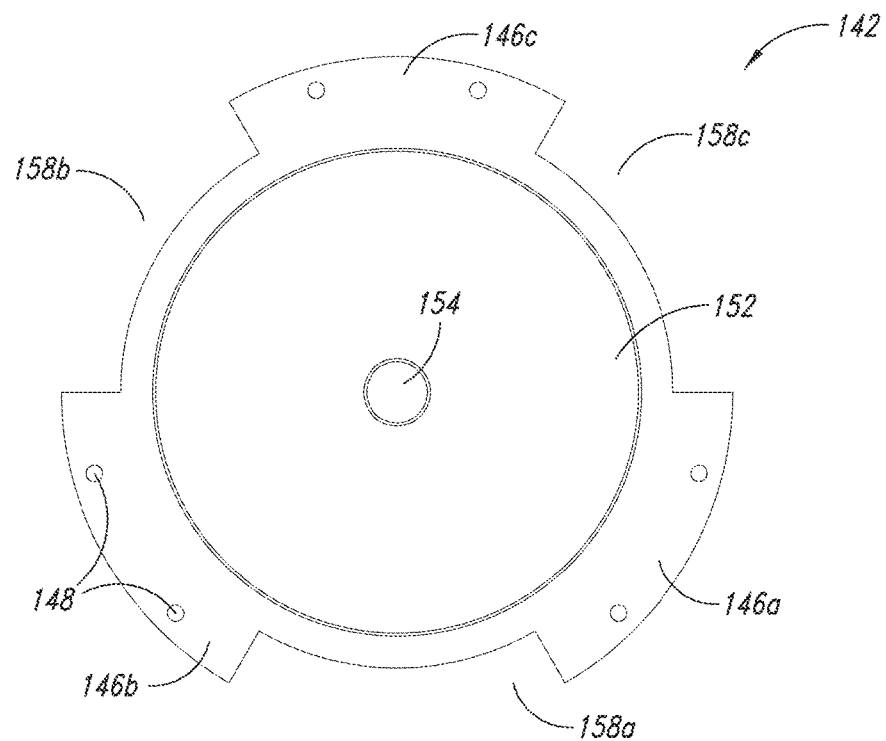
Figure 7E:
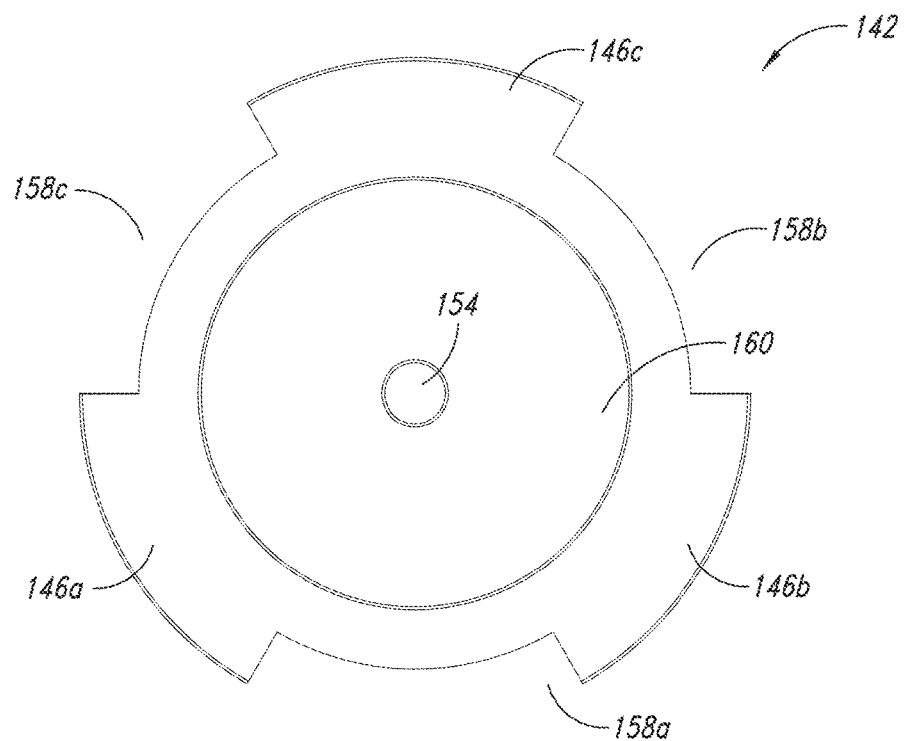

FIGS. 7A-7E are various views of the interior base 142 of the descent-restraint system housing 108 in accordance with the present disclosure. Briefly, FIG. 7A is a perspective view of the interior base 142, FIG. 7B is a front view of the interior base 142, FIG. 7C is a back view of the interior base 142, FIG. 7D is a top view of the interior base 142, and FIG. 7E is a bottom view of the interior base 142.

The interior base 142 includes a ring 156, a top surface 152, and a plurality of flanges 146a-146c. The ring 156 is hollow and sized and shaped to fit around the seat 136 of the connector base 106 such that an interior diameter of the ring 156 is slightly larger than the diameter of the seat 136. The top surface 152 in conjunction with the ring 156 is sized and shaped such that a bottom 160 of the top surface 152 sits on the seat 136 when the housing 108 is attached to the connector base 106. The top surface 152 includes an aperture 154 to enable the output port 134 of the connector base 106 to extend through the top surface 152 and allow for fluid communication between the inflation mechanism and the deployment tube.

The ring 156 includes a groove 150 that is sized and shaped to fit an O-ring around the ring 156. As described in more detail below, the O-ring provides a pressure fit seal against the deployment tube and the exterior base 144.

The plurality of flanges 146a-146c are positioned radially around the ring 156 and extend away therefrom to create a plurality of slots 158a-158c. The flanges 146 are each sized and shaped to traverse through the plurality of slots 124a-124c on the connector base 106, respectively, such that the tabs 126 on the connector base traverse through the slots 158 on the interior base 142. Moreover, the flanges 146 on the interior base 142 are each sized and shaped so that they, in conjunction with the flanges on the exterior base 144, slide though the locking groove 125 and under the tabs 126a-126c of the connector base 106 when the housing 108 is rotated on the central axis with the connector base 106. In various implementations, each flange 146 may also include a plurality of pin accepters 148. Each of the pin accepters 148 are sized, shaped, and arranged on each flange 146 to accept a corresponding pin on the flanges of the exterior base 144, as described in more detail below. In one implementation, each pin accepter 148 only partially extends into the flange 146, which is shown by FIG. 7D (a top view of the interior base 142) and 7E (a bottom view of the interior base 142).

Figure 8A:
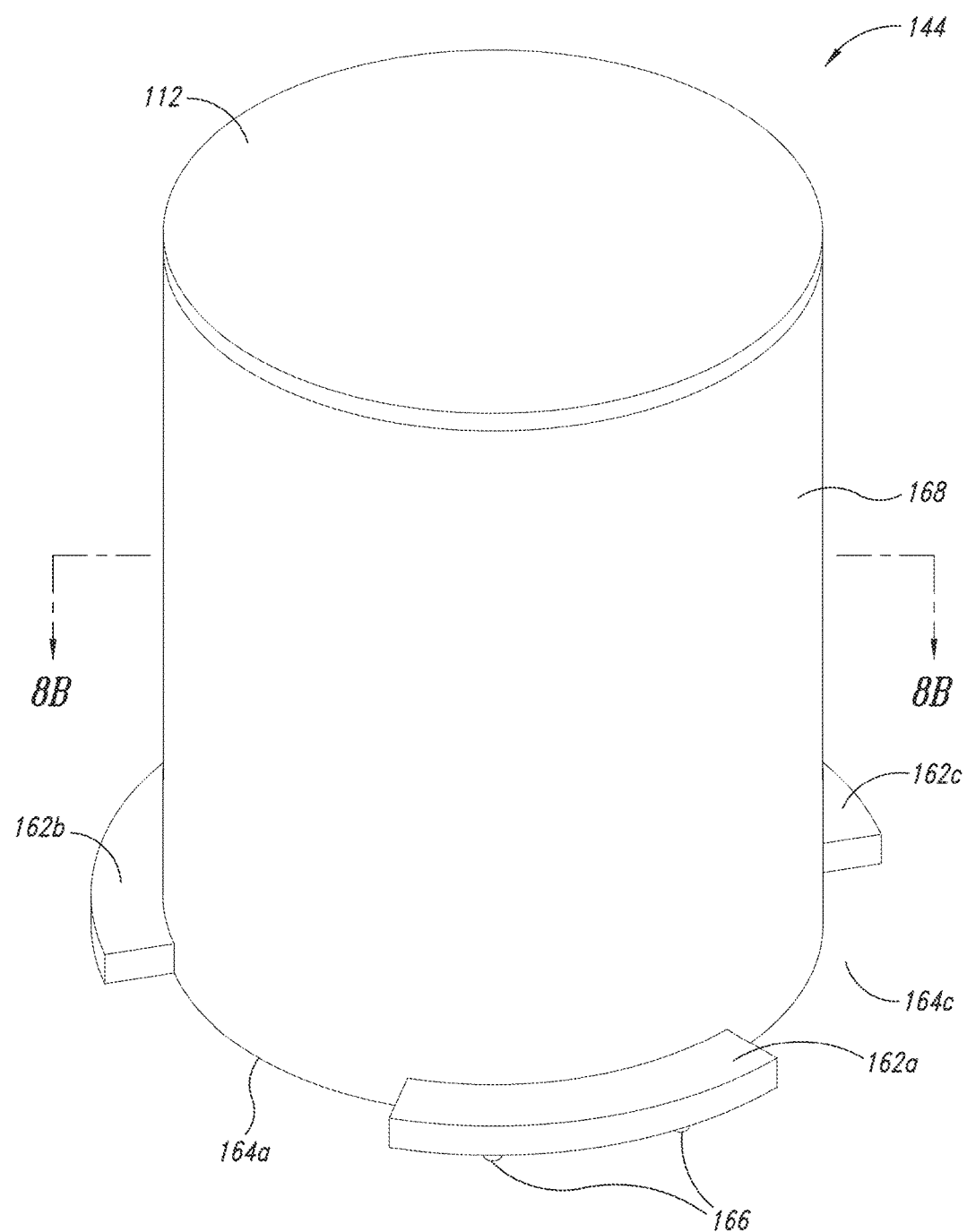
FIGS. 8A-8F are various views of an exterior base of the housing illustrated in FIG. 6 in accordance with the present disclosure.
Figure 8B:
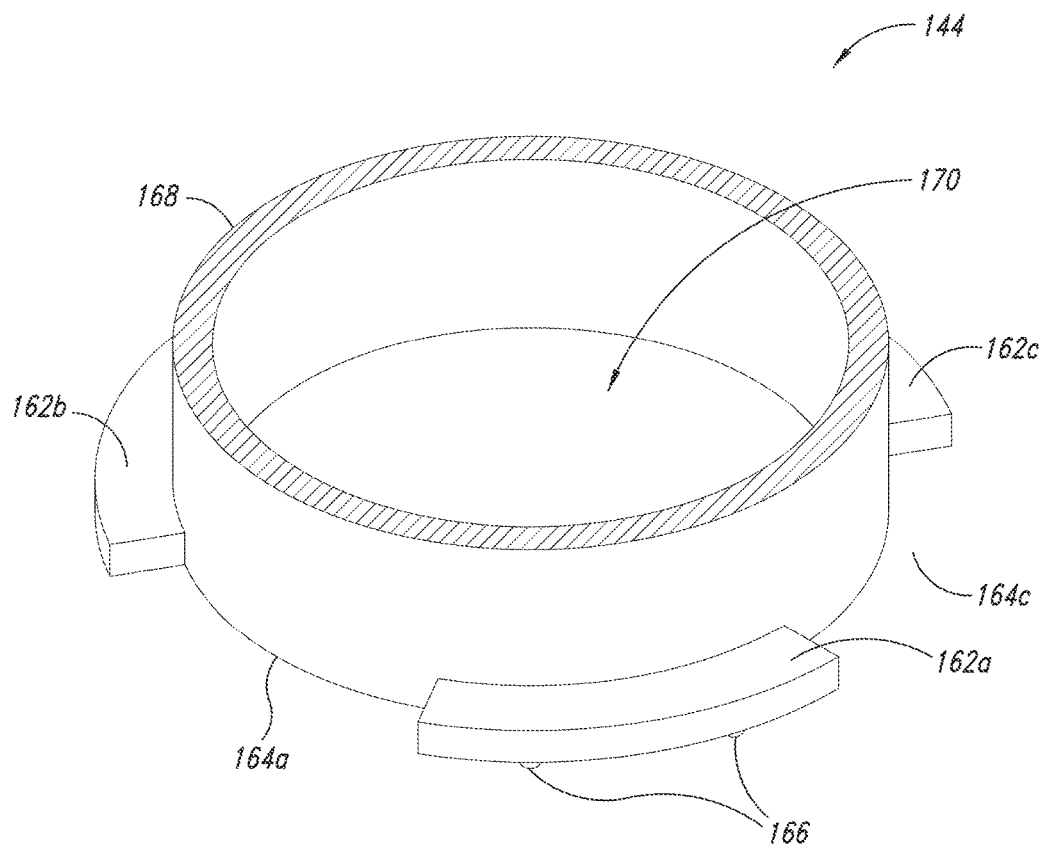
Figure 8C:
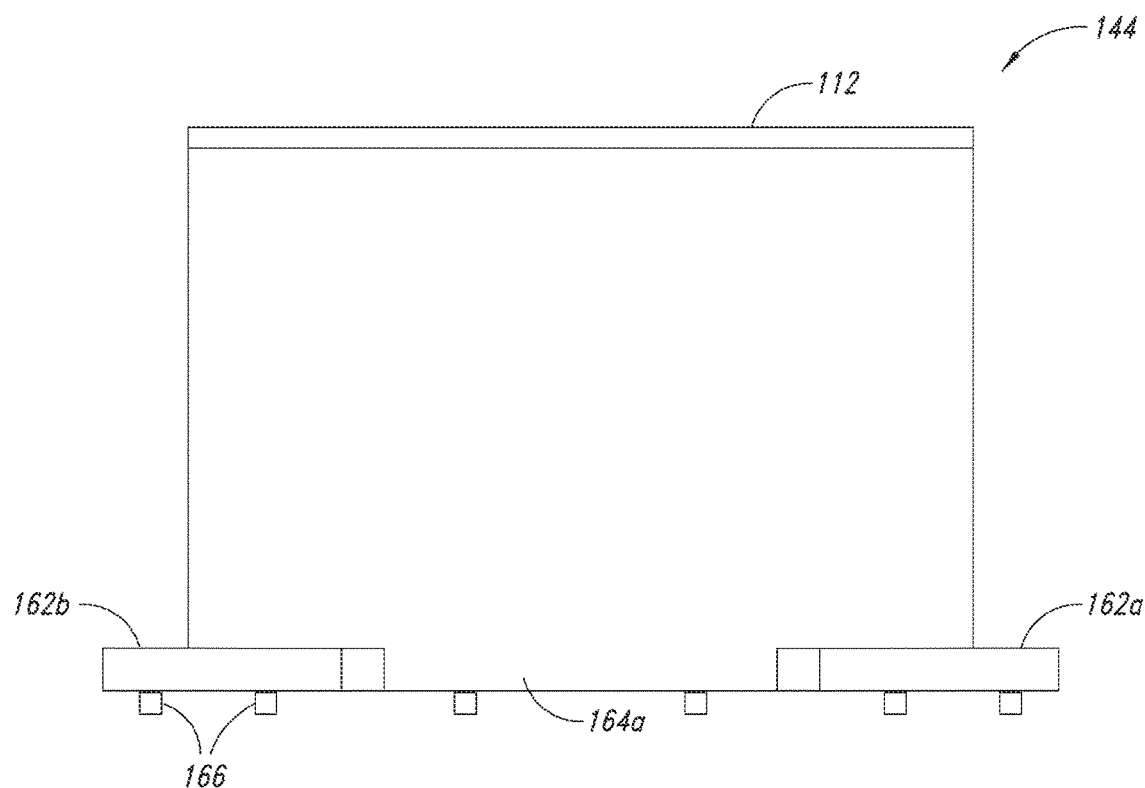
Figure 8D:
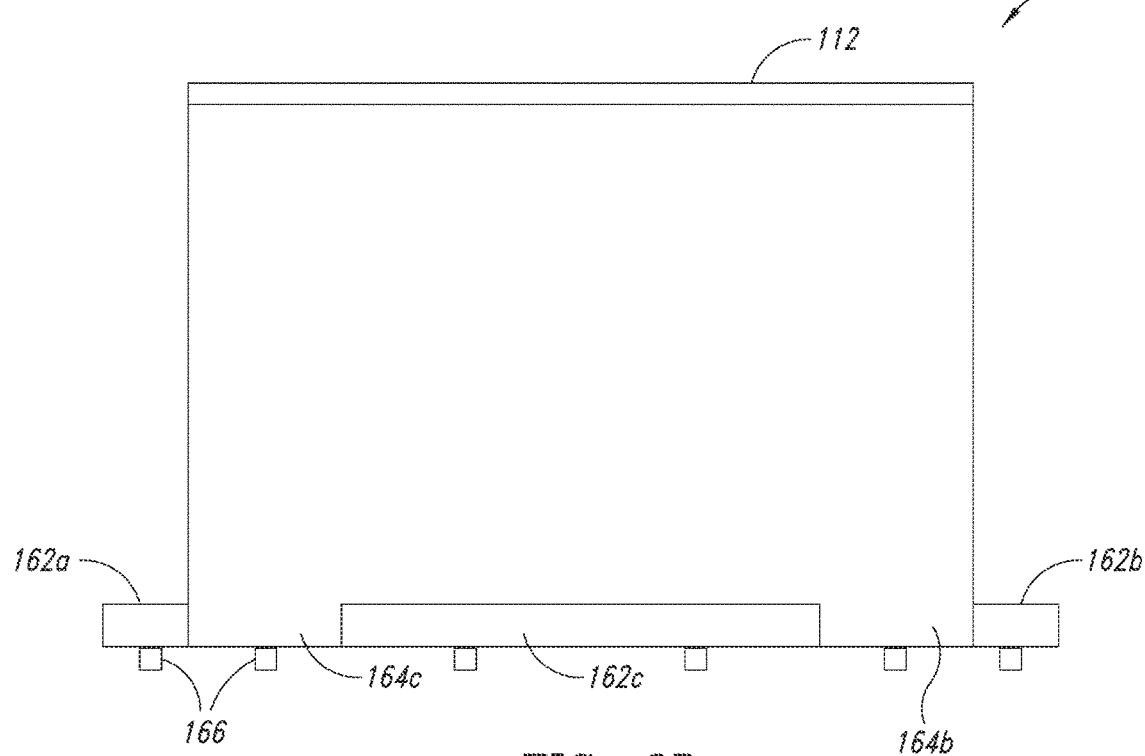
Figure 8E:
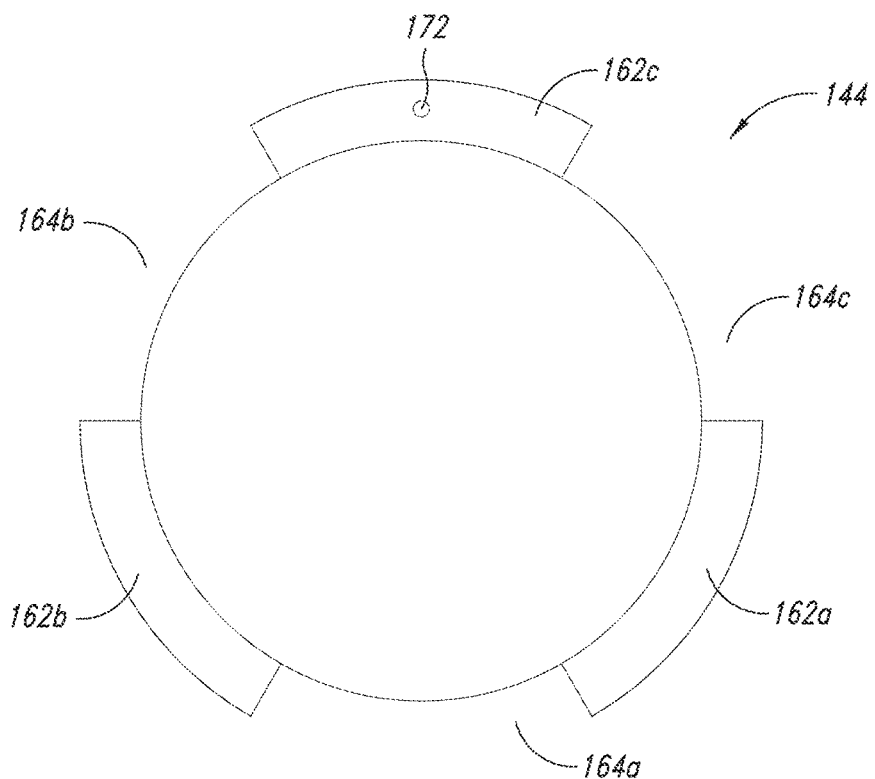
Figure 8F:
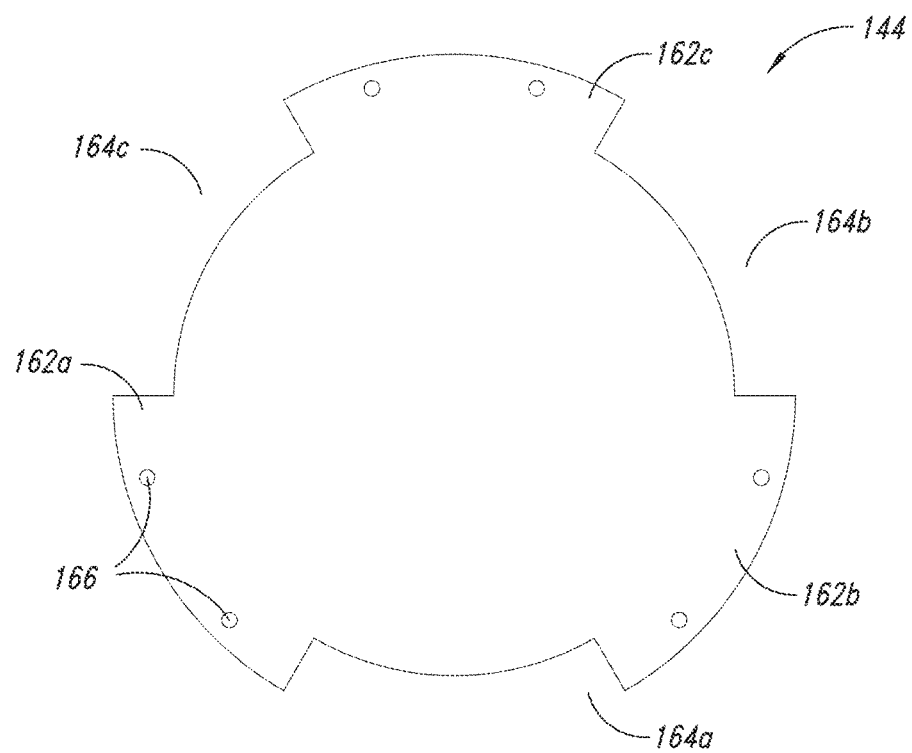

FIGS. 8A-7F are various views of the exterior base 144 of the descent-restraint system housing 108 in accordance with the present disclosure. Briefly, FIG. 8A is a perspective view of the exterior base 144, FIG. 8B is a cutaway, perspective view of the exterior base 144, FIG. 8C is a front view of the exterior base 144, FIG. 8D is a back view of the exterior base 144, FIG. 8E is a top view of the exterior base 144, and FIG. 8F is a bottom view of the exterior base 144.

The exterior base 144 includes a body 168, the housing door 112, and a plurality of flanges 162a-162c. The body 168 is a hollow structure that is sized and shaped to form a storage void 170 that encases or encloses the deployment tube 104 (in an uninflated state) and the aerodynamic decelerator 110 (in a folded state) prior to inflation of the deployment tube 104 and deployment of the aerodynamic decelerator 110. In various implementations, an interior diameter of the body 168 is slightly larger than the outer diameter of the ring 156 of the interior base 142. The difference in the interior diameter of the body 168 and the outer diameter of the ring 156 is dependent on a thickness of the material used as the deployment tube 104 such that the deployment tube 104 is friction fit between the interior base 142 and the exterior base 144. As mentioned above, the interior base 142 includes an groove 150 that seats an O-ring that provides an air-tight seal between the interior base 142 and the deployment tube 104 by pressing the deployment tube 104 against the exterior base 144.

The flanges 162a-162c of the exterior base 144 are sized and shaped substantially similar or the same as flanges 146a-146c of the interior base 142, respectively. The flanges 162 are positioned radially around the body 168 to create a plurality of slots 164a-164c. The flanges 162 are each sized and shaped to traverse through the plurality of slots 124a-124c on the connector base 106, respectively, such that the tabs 126 on the connector base 106 traverse through the slots 164 on the exterior base 144. Moreover, the flanges 162 on the exterior base 144 are each sized and shaped so that they, in conjunction with the flanges 146 on the interior base 142, slide though the locking groove 125 and under the tabs 126a-126c of the connector base 106 when the housing 108 is rotated on the central axis with the connector base 106.

In various implementations, the deployment tube extends out of the exterior base 144 between the flanges 162 of the exterior base 144 and the flanges 146 of the interior base 142. In some implementations, one or more of the flanges 162 include a pin 166 that extends below the flanges 162. These pins 166 are sized and shaped to engage the pin accepters 148 in the flanges 146 of the interior base 142. When the pins 166 are engaged with the pin accepters 148, rotation of the exterior base 144 about the interior base 142 is reduced, as is the movement of the deployment tube between the interior base 142 and the exterior base 144.

In various implementations, flange 162c includes a locking aperture 172 that is sized and shaped to accept the lock 132. In this way, when the lock 132 is engaged with the locking aperture 172 on the exterior base 144 of the housing 108, the flanges 146 of the interior base 142 and the flanges 162 of the exterior base 144 line up with or are otherwise under the tabs 126 of the connector base 106, which prevents the housing 108 from rotating in the connector base 106.

Figure 9:
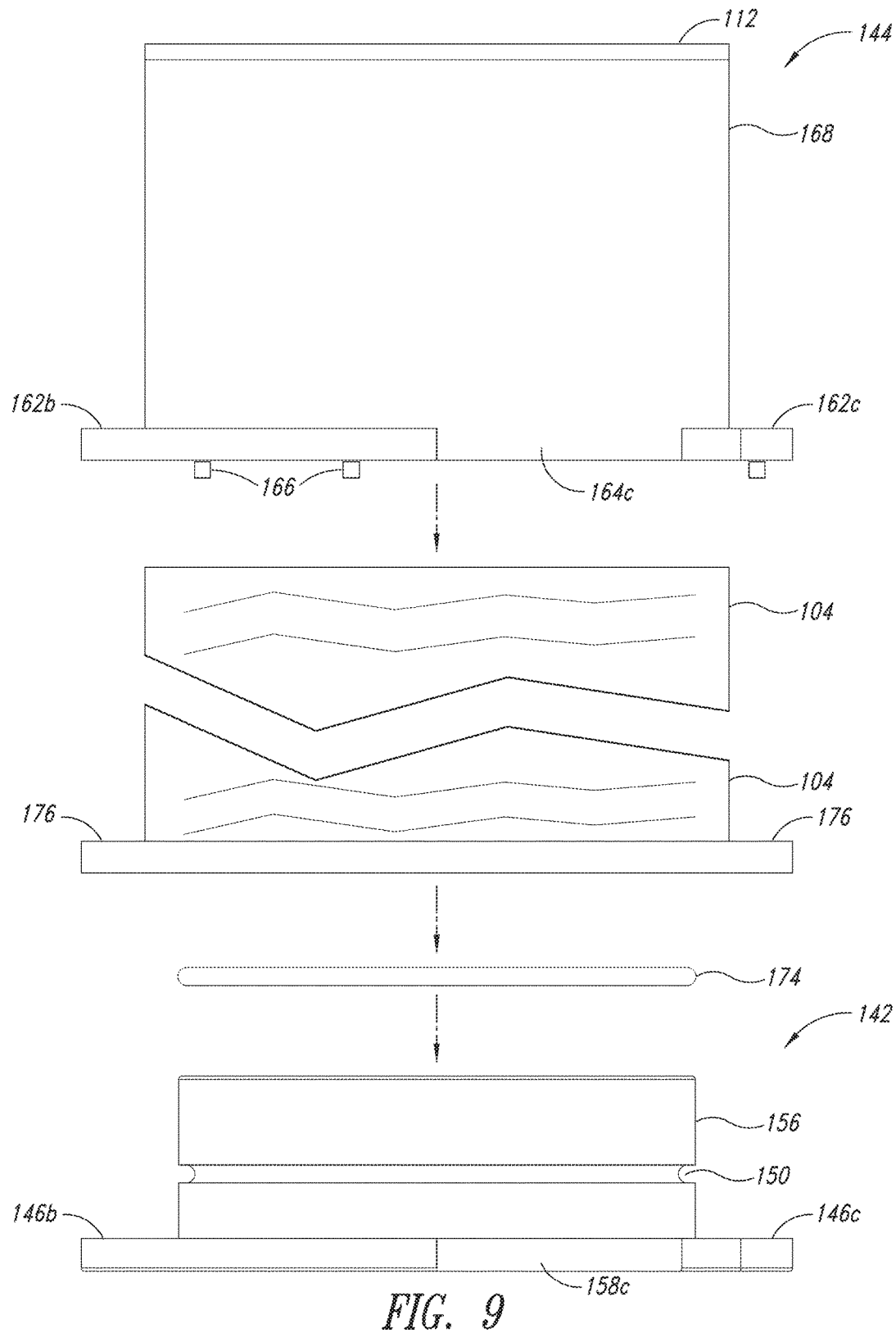
FIG. 9 is an exploded view of the housing and deployment tube of the descent-restraint system illustrated in FIG. 4 in accordance with the present disclosure.
Figure 10:
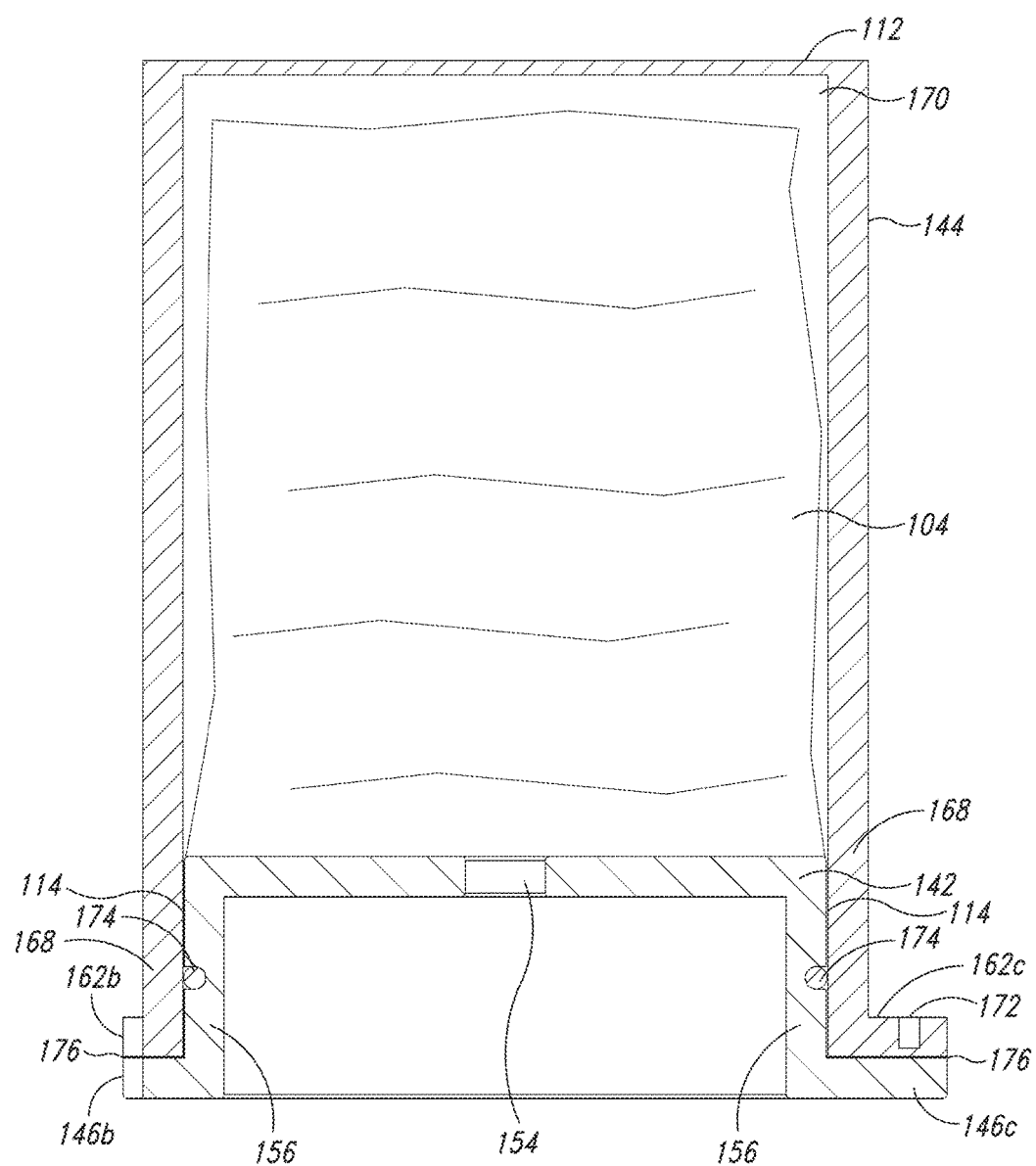
FIG. 10 is a front cross-section view of the housing and deployment tube of the descent-restraint system illustrated in FIG. 9 in accordance with the present disclosure.

FIG. 9 is an exploded view of the housing 108 and deployment tube 104 of the descent-restraint system 102 in accordance with the present disclosure. And FIG. 10 illustrates a front cross-section view of the arrangement of the combined housing 108 and deployment tube 104.

As illustrated, an O-ring 174 is positioned around the ring 156 of the interior base 142. As described above, the O-ring 174 is positioned in the groove 150 and provides a seal so that the deployment tube 104 can pressurize and inflate. The first end 114 of the uninflated deployment tube 104 is positioned over the O-ring 174 and the ring 156 of the interior base 142. The body 168 of the exterior base 144 is positioned over the deployment tube 104 and onto the ring 156 of the interior base 142 such that the first end 114 of the deployment tube 104 is friction fit between the body 168 of the exterior base 144 and the ring 156 of the interior base 142. The positioning of the exterior base 144 over the interior base 142 results in the deployment tube 104 being positioned in the storage void 170 of the exterior base 144 so that it can expand though the housing door 112 when inflated.

For ease of illustration, the aerodynamic decelerator 110 is not shown in these figures, but it should be recognized, as described elsewhere herein, that the aerodynamic decelerator 110 (in a folded state) is attached to a second end of the uninflated deployment tube 104 and positioned in the storage void 170 of the exterior base 144 inside the housing 108.

The interior base 142, the deployment tube 104, and the exterior base 144 are aligned so that the flanges 162 of the exterior base 144 line up with the flanges 146 of the interior base 142. In some implementations, tube tabs 176 of the deployment tube 104 are positioned between the flanges 162 and 146 when the exterior base 144 is positioned onto the interior base 142. In other implementations, the tube tabs 176 may be optional, and the friction fit between the ring 156 of the interior base 142 and the body 168 of the exterior base 144 may be sufficient to hold the deployment tube 104. In yet other implementations, an adhesive or other connection mechanism may be used to strengthen the connection between the first end 114 of the deployment tube 104 and the housing 108.

Also, the aperture 154 provides a structure in which the input port 130 of the connector base 106 can be positioned so that the deployment tube 104 is in fluid communication with the inflation mechanism.

Figure 11:
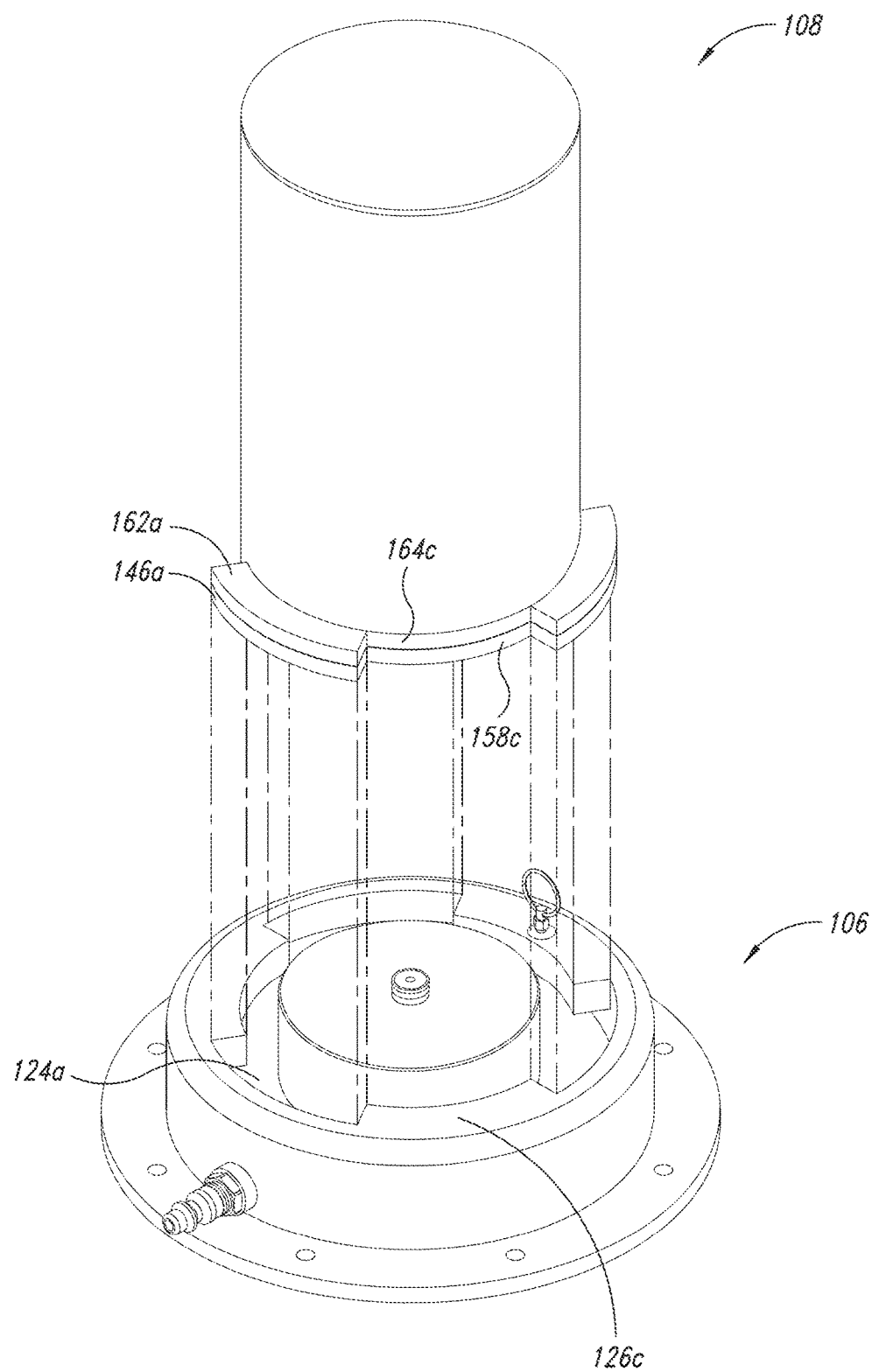
FIG. 11 is an exploded perspective view of the housing and the connector base of the descent-restraint system illustrated in FIG. 4 in accordance with the present disclosure.

FIG. 11 is an exploded perspective view of the housing 108 and the connector base 106 of the descent-restraint system 102 in accordance with the present disclosure. As described above, the housing 108 is removably connected to the connector base 106. In this illustration, the housing 108 fits into the connector base 106 such that the flanges on the housing 108 line up with the slot of the connector base 106 (e.g., flange 162a of the exterior base 144 of the housing 108 and flange 146a of the interior base 142 of the housing 108 line up with slot 124a of the connector base 106). Similarly, the tabs on the connector base 106 line up with the slots in the housing 108 (e.g., tab 126c of the connector base 106 lines up with slot 164c of the exterior base 144 of the housing 108 and slot 158c of the interior base 142 of the housing 108). Once the housing 108 is seated into the connector base 106, the housing 108 is rotated about its central axis such that the flanges on the housing 108 rotate under the tabs on the connector base 106. In this way, the housing 108 is rigidly affixed to the connector base 106, which results in the deployment tube 104 being rigidly attached to the connector base 106 (and thus rigidly connected to the aerial vehicle).

Figure 12:
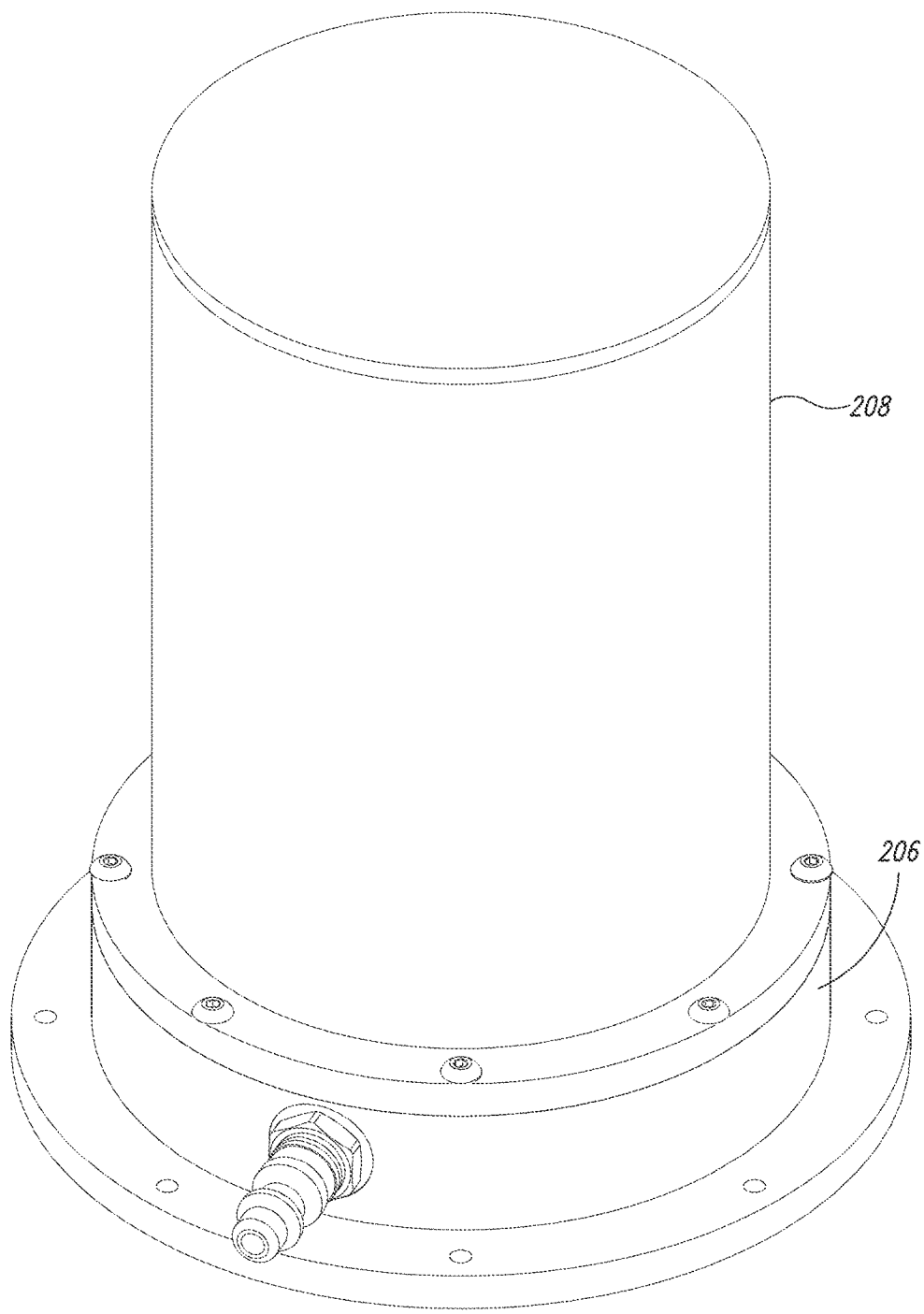
FIG. 12 is a perspective view of another implementation of a descent-restraint system in accordance with the present disclosure.

FIG. 12 is a perspective view of another implementation of a descent-restraint system 202 in accordance with the present disclosure. As described in more detail in the following figures, the descent-restraint system 202 includes a housing 208 and a connector base 206. Similar to what is described above in conjunction with descent-restraint system 102, the housing 208 is removably coupled to the connector base 206. This connection allows for the housing 208 to be rigidly connected to the connector base 206 (and thus the aerial vehicle) while allowing for a user to remove the housing 208 without having to detach the connector base 206 from the aerial vehicle. This descent-restraint system 202 may utilize one of the packing and deployment processes described above in conjunction with FIGS. 2A and 2B, or it may utilize another packing and deployment process.

Figure 13A:
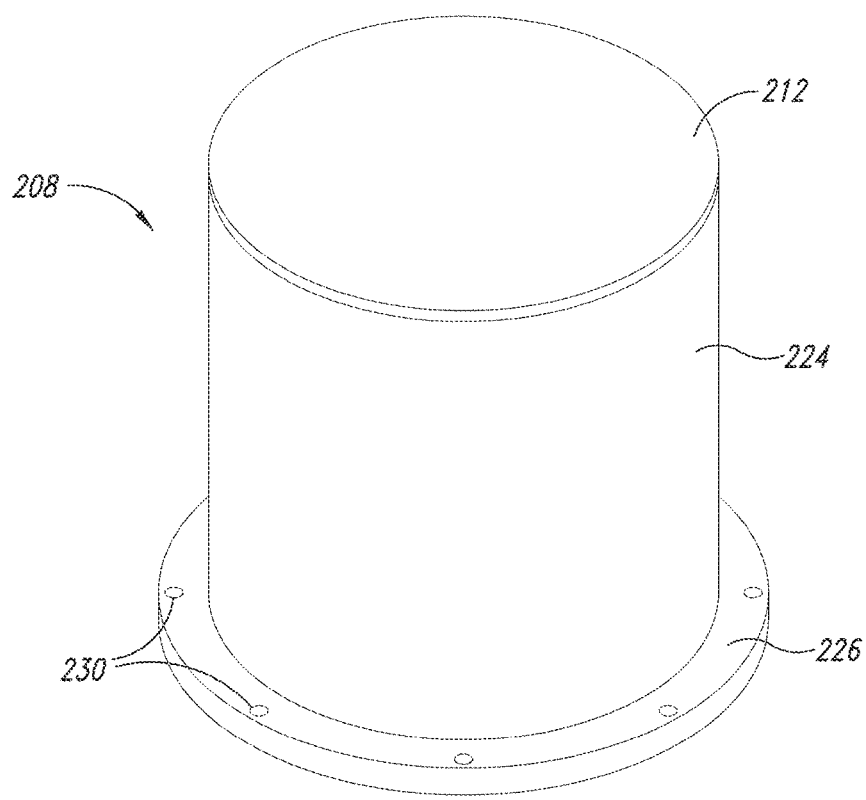
FIGS. 13A-13B are various views of one implementation of a housing of the descent-restraint system illustrated in FIG. 12 in accordance with the present disclosure.
Figure 13B:
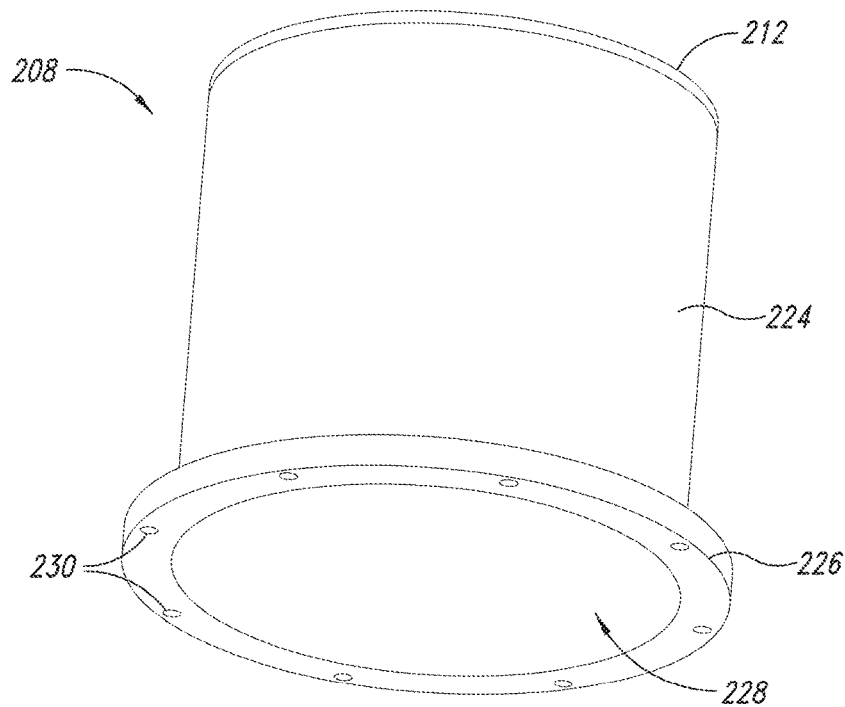

FIGS. 13A-13B are perspective views of one implementation of the housing 208 of the descent-restraint system 202 in accordance with the present disclosure. In this implementation, the housing 208 includes a housing door 212, a body 224, and a bracket 226. The housing door 212 is structured and sized to enclose the housing 208 and enable the deployment tube and the aerodynamic decelerator 110 to extend away from the descent-restraint system 202 and the aerial vehicle in response to initiation of deployment of the aerodynamic decelerator 110. The housing door 212 may be a variation of the housing door 112 described above.

The body 224 is a hollow structure that is sized and shaped to form a storage void 228 that encases or encloses the deployment tube 104 (in an uninflated state) and the aerodynamic decelerator 110 (in a folded state) prior to inflation of the deployment tube 104 and deployment of the aerodynamic decelerator 110.

The bracket 226 is structured to mount or attach the housing 208 and the deployment tube to the connector base 206. As illustrated, the bracket 226 includes a plurality of connector apertures 230 that are distributed radially around a center near an outer edge of the bracket 226. The connector apertures 230 are structured and sized to allow a screw, bolt, or other connector to attach the housing 208 to the connector base 206. It should be recognized that other connection mechanisms may also be employed to connect the housing 208 to the connector base 106, including, but not limited to, adhesives, clamps, welds, or other bonding methods or mechanisms.

Figure 14A:
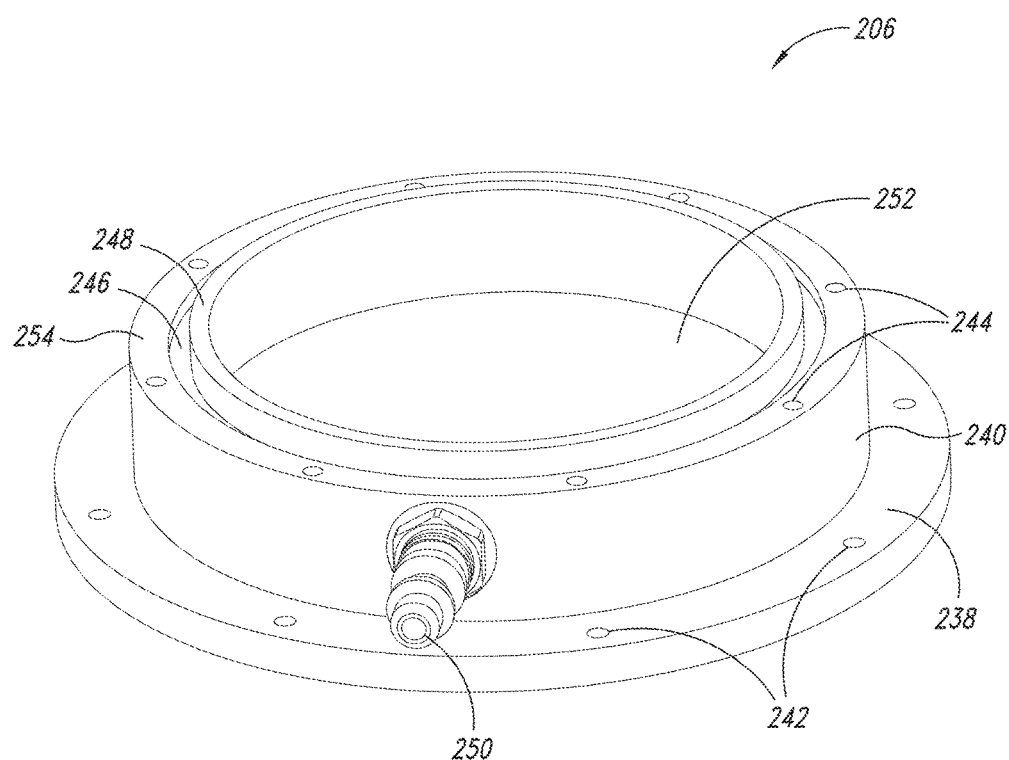
FIGS. 14A-14C are various views of one implementation of a connector base of the descent-restraint system illustrated in FIG. 12 in accordance with the present disclosure.
Figure 14B:
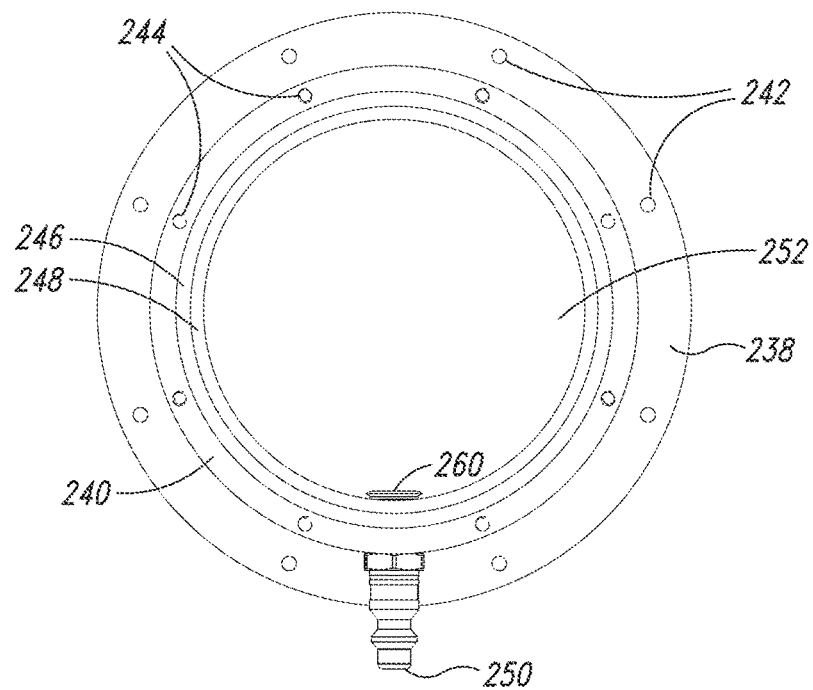
Figure 14C:
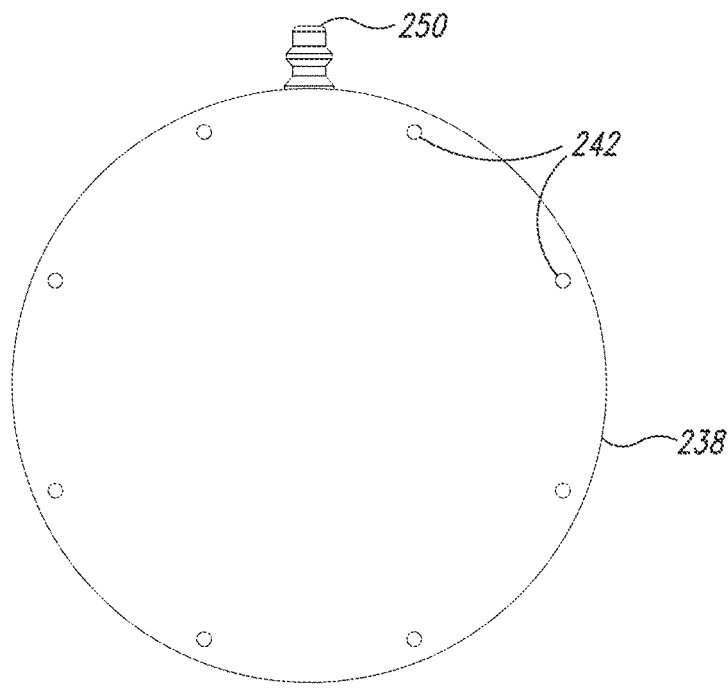

FIGS. 14A-14C are various views of one implementation of the connector base 206 of the descent-restraint system 202 in accordance with the present disclosure. Briefly, FIG. 14A is a perspective view of the connector base 206, FIG. 14B is a top view of the connector base 206, and FIG. 14C is a bottom view of the connector base 206.

The connector base 206 includes a bracket 238 and a ring 240 that are on a same central axis. In the illustrated implementation, the bracket 238 and the ring 240 are circular; however, in other implementations, these components may be square, rectangular, or other polygonal shapes, and may be the same or different shapes from one another.

The bracket 238 is structured to mount or attach the connector base 206 to an aerial vehicle 100. As illustrated, the bracket 238 includes a plurality of connector apertures 242 that are distributed radially around a center near an outer edge of the bracket 238. The connector apertures 242 are structured and sized to allow a screw, bolt, or other connector to attach the connector base 206 to the aerial vehicle. It should be recognized that other connection mechanisms may also be employed to connect the connector base 206 to the aerial vehicle, including, but not limited to, adhesives, clamps, welds, or other bonding methods or mechanisms.

The ring 240 has an outer diameter that is the same or larger than the diameter of the bracket 226 of the housing 208. The ring 240 includes an interior rim 248 and an exterior rim 254. The interior rim 248 is higher than the exterior rim 254, and the interior rim 248 and the exterior rim 254 are separated by a groove 246. The groove 246 is sized and shaped to fit an O-ring on top of the ring 240 between the interior rim 248 and the exterior rim 254. The interior rim 248 provides an internal structure in which the O-ring presses against when the housing 208 is mounted to the connector base 206. As described in more detail herein, the O-ring provides a pressure fit seal between the connector base 206 and the deployment tube when the housing 208 is connected to the connector base 206.

The exterior rim 254 of the ring 240 includes a plurality of connector apertures 244. These connector apertures 244 are positioned to align with the connector apertures 230 in the bracket 226 of the housing 208. The connector apertures 244 in the ring 240 of the connector base 206 are structured and sized to allow a screw, bolt, or other connector to attach the bracket 226 of the housing 208 to the connector base 206. It should be recognized that other connection mechanisms may also be employed to connect the housing 208 to the connector base 206, including, but not limited to, adhesives, clamps, welds, or other bonding methods or mechanisms.

The connector base 206 also includes an input port 250 that is in fluid communication with an output port 260 to enable air or other fluid to flow from an inflation mechanism and into the deployment tube as described herein. In the illustrated implementation, the input port 250 and the output port 260 are structured into a side of the ring 240. However, it should be recognized that the input port 250 and the output port 260 may be positioned elsewhere on the connector base so long as it provides for fluid communication between the inflation mechanism and the deployment tube. For example, in some implementations, the input port 250 and the output port 260 may be positioned in the base 252 of the connector base 206.

Figure 15:
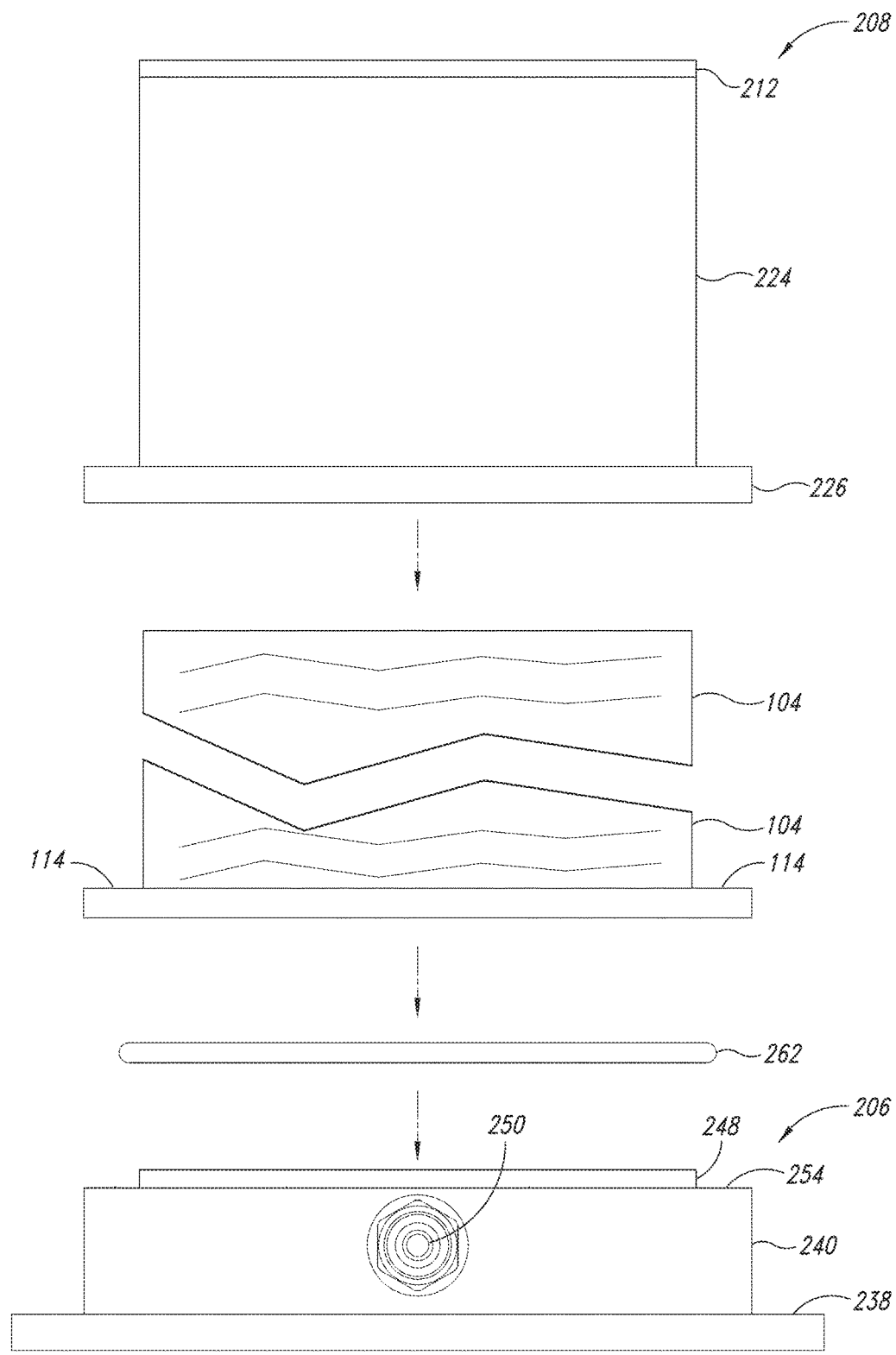
FIG. 15 is an exploded view of the descent-restraint system illustrated in FIG. 12 in accordance with the present disclosure.

FIG. 15 is an exploded view of the housing 208 and deployment tube 104 of the descent-restraint system 202 in accordance with the present disclosure. As illustrated, an O-ring 262 is positioned around the interior rim 248 of the ring 240 of the connector base 206. As described above, the O-ring 262 is positioned in the groove 246 and provides a seal so that the deployment tube 104 can pressurize and inflate.

The first end 114 of the uninflated deployment tube 104 is positioned over the O-ring 262 and onto the exterior rim 254 on the ring 240 of the connector base 206. The body 224 of the housing 208 is positioned over the deployment tube 104 with the bracket 226 of the housing 208 pressed against the first end 114 of the deployment tube 104 and the exterior rim 254 on the ring 240 of the connector base 206, which creates a friction fit for the deployment tube 104 between the housing 208 and the connector base 206. Although the illustrated implementation utilizes a friction fit, an adhesive or other connection mechanism may be used to strengthen the connection between the first end 114 of the deployment tube 104 and the housing 208 or the connector base 206.

For ease of illustration the aerodynamic decelerator 110 is not shown in this figure, but it should be recognized, as described elsewhere herein, that the aerodynamic decelerator 110 (in a folded state) is attached to a second end of the uninflated deployment tube 104 and positioned in the storage void 228 of the housing 208.

Figure 16A:
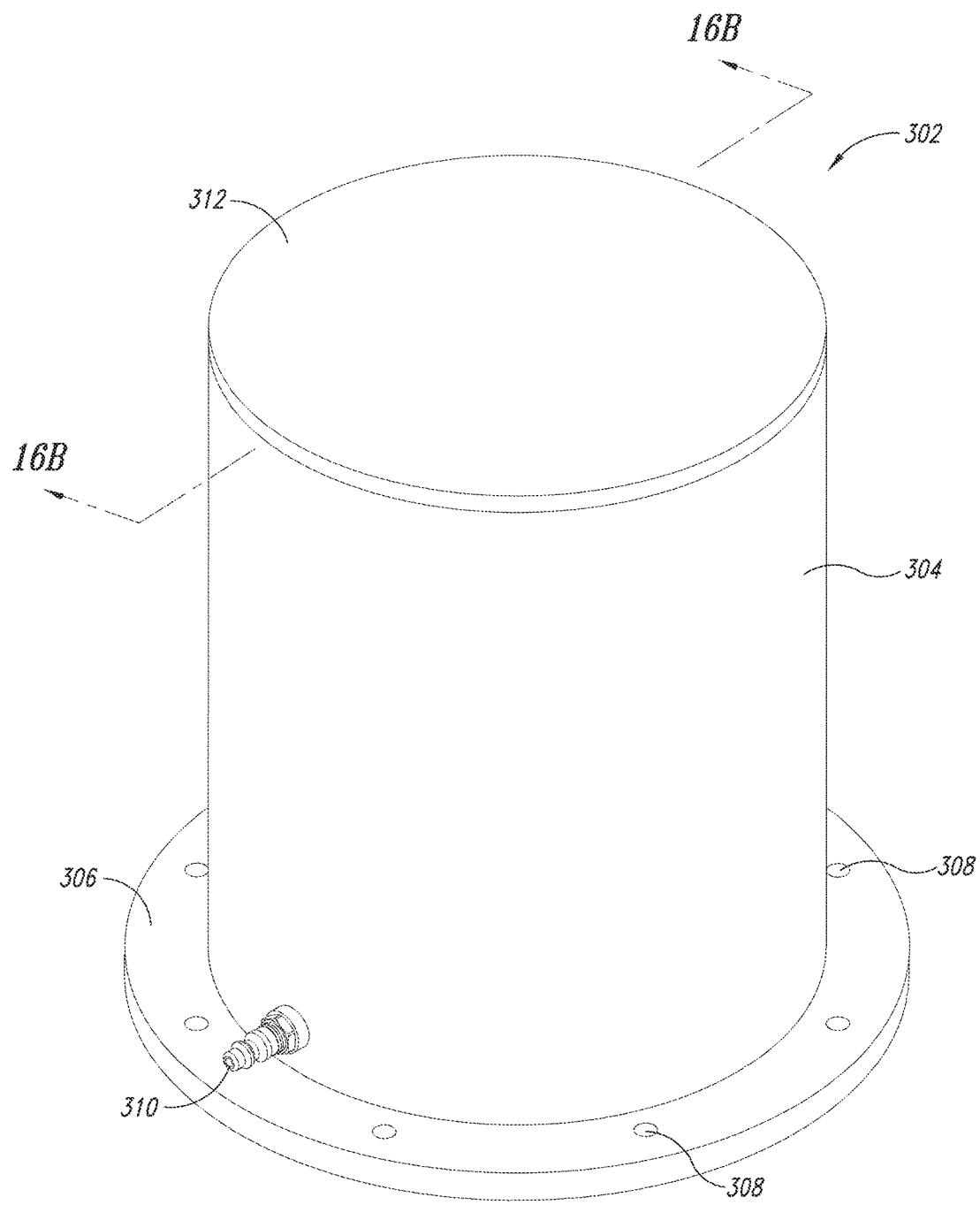
FIGS. 16A-16B illustrate an yet another implementation of a descent-restraint system in accordance with the present disclosure.
Figure 16B:
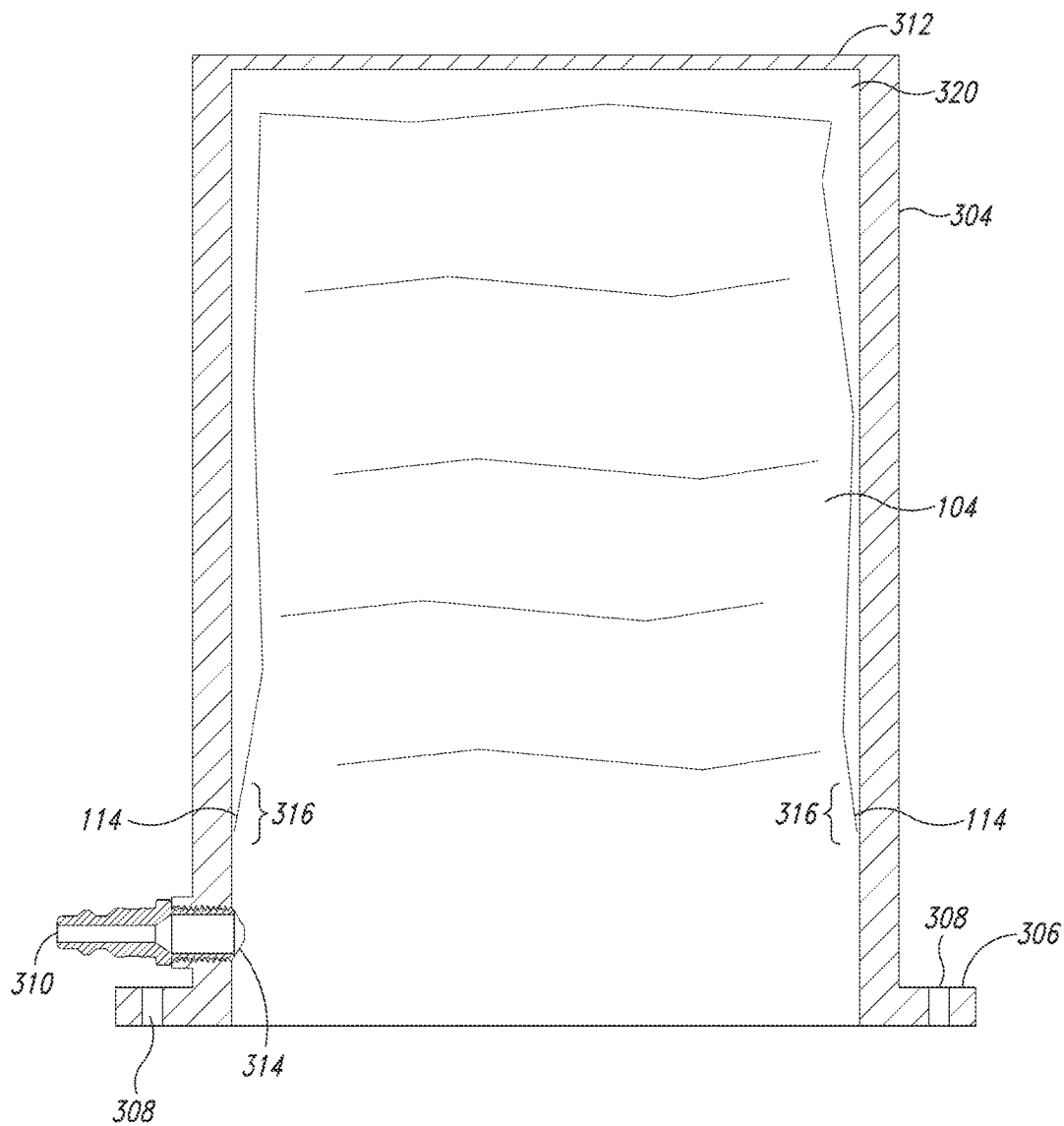

FIGS. 16A-16B illustrate yet another implementation of a descent-restraint system 302 in accordance with the present disclosure. Briefly, FIG. 16A is a perspective view of the descent-restraint system 302, and FIG. 16B is a cross-section view of the descent-restraint system 302. This descent-restraint system 302 may utilize one of the packing and deployment processes described above in conjunction with FIGS. 2A and 2B, or it may utilize another packing and deployment process.

The descent-restraint system 302 includes a housing 304, a connector base 306, and a housing door 112. In this implementation, the housing 304 is attached to the connector base 306, but is not removable like the other implementations described above. The housing door 312 is structured and sized to enclose the housing 304 and enable the deployment tube and the aerodynamic decelerator 110 to extend away from the descent-restraint system 302 and an aerial vehicle in response to initiation of deployment of the aerodynamic decelerator 110. The housing door 312 may be a variation of the housing door 112 described above.

The connector base 306 is structured to mount or attach the descent-restraint system 302 to an aerial vehicle 100. As illustrated, the connector base 306 includes a plurality of connector apertures 308 that are distributed radially around a center near an outer edge of the connector base 306. The connector apertures 308 are structured and sized to allow a screw, bolt, or other connector to attach the descent-restraint system 302 to the aerial vehicle. It should be recognized that other connection mechanisms may also be employed to connect the descent-restraint system 302 to the aerial vehicle, including, but not limited to, adhesives, clamps, welds, or other bonding methods or mechanisms.

The housing 304 is a hollow structure that is sized and shaped to form a storage void 320 that encases or encloses the deployment tube 104 (in an uninflated state) and the aerodynamic decelerator 110 (in a folded state) prior to inflation of the deployment tube 104 and deployment of the aerodynamic decelerator 110. The first end 114 of the deployment tube 104 is attached to a mounting area 316 on an inside of the housing 304 via an adhesive, weld, or other bonding agent or mechanism. The housing 304 also includes an input port 310 that is in fluid communication with an output port 314 to enable air or other fluid to flow from an inflation mechanism and into the deployment tube as described herein. In the illustrated implementation, the housing 304 and the connector base 306 are circular; however, in other implementations, these components may be square, rectangular, or other polygonal shapes, and may be the same or different shapes from one another.

For ease of illustration the aerodynamic decelerator 110 is not shown in this figure, but it should be recognized, as described elsewhere herein, that the aerodynamic decelerator 110 (in a folded state) is attached to a second end of the uninflated deployment tube 104 and positioned in the storage void 320 of the housing 304.

Figure 17A:
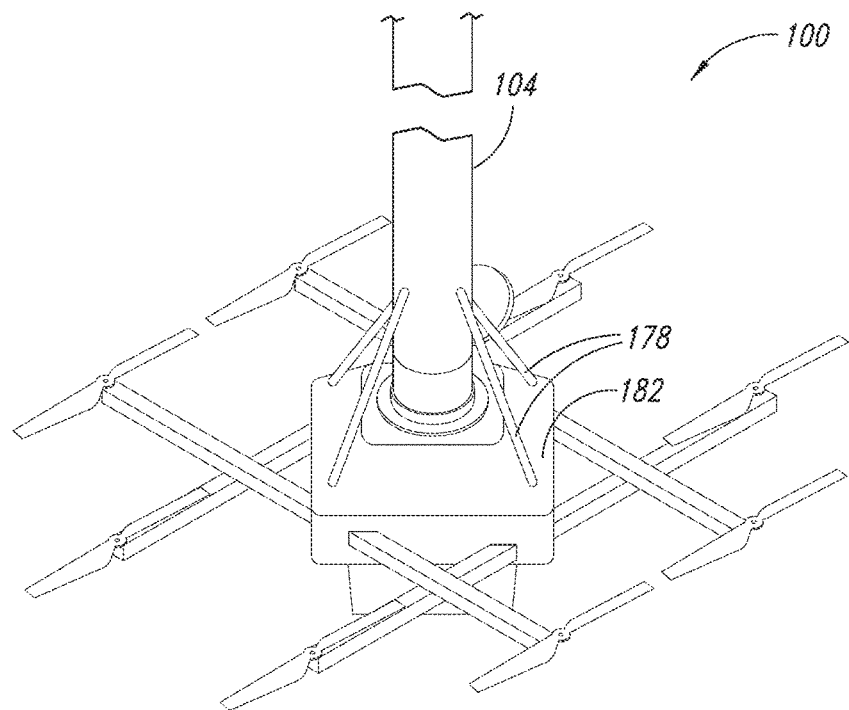
FIGS. 17A-17B illustrate alternative implementations of additional support members of the descent-restraint system in accordance with the present disclosure.

FIGS. 17A-12B illustrate alternative implementations of additional support members of the descent-restraint system in accordance with the present disclosure. FIG. 17A illustrates a descent-restraint system as described above, but that also includes a plurality of support straps 178. The plurality of support straps 178 have a first end that connects to the airframe 182 of the aerial vehicle 100 and a second end that connects to a body of the deployment tube 104. In various implementations, the support straps 178 may be contained in the housing of the descent-restraint system 102. As the deployment tube 104 is inflated and extends away from the aerial vehicle 100, the support straps 178 tighten and become taut when the deployment tube 104 is in its fully inflated state. In this way, the support straps 178 provide additional support to reduce the sway of the deployment tube 104 after it is inflated and the aerial vehicle 100 is descending to the ground. In another implementation, the support straps 178 may contain a breakaway connection (e.g., a hook and loop connection) with the aerial vehicle 100 along the length of the straps such that the length of the support straps 178 break away from the aerial vehicle 100 as the deployment tube 104 is inflated and become taut when the deployment tube 104 is in its fully inflated state.

Figure 17B:
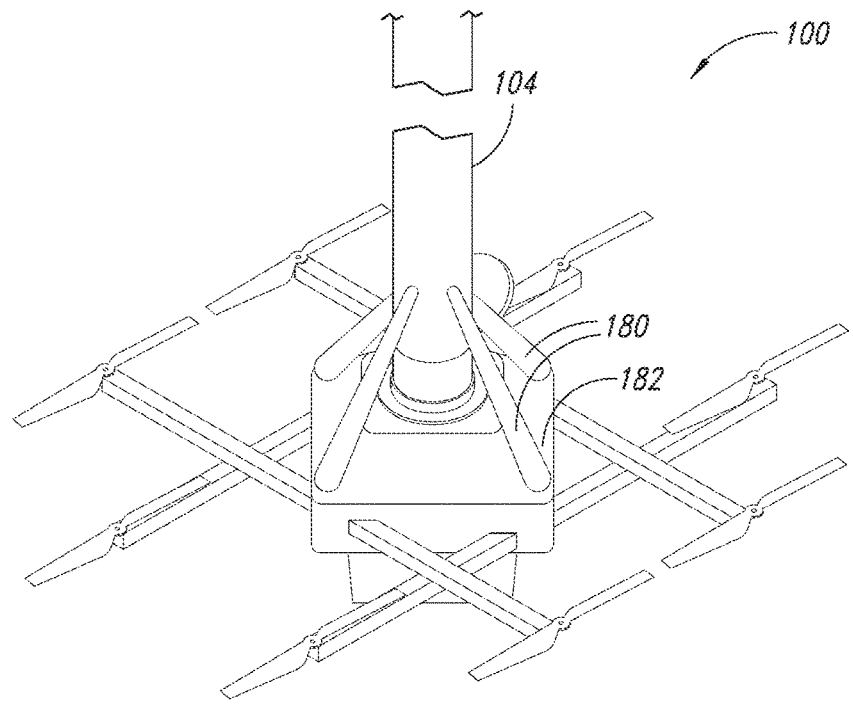

FIG. 17B illustrates a descent-restraint system as described above, but that the deployment tube 104 includes a plurality of inflatable support tubes 180 that connect to the body of the deployment tube 104. In some implementations, each separate inflatable support tube 180 is in fluid communication with the inflation mechanism that inflates the deployment tube 104. In other implementations, one or more of the inflatable support tubes 180 are in fluid communication with a second inflation mechanism. Moreover, in some implementations, the inflatable support tubes 180 are in fluid communication with the deployment tube 104, while in other implementations, the inflatable support tubes 180 are individually pressurized tubes that are not in fluid communication with the deployment tube 104. These additional inflatable support tubes provide additional support to reduce the sway of the deployment tube 104 after it is inflated and the aerial vehicle 100 is descending to the ground.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system to reduce a velocity of an aerial vehicle, comprising:
   an aerodynamic decelerator that creates drag when in a deployed state to reduce the velocity of the aerial vehicle;
   a housing that attaches to the aerial vehicle and stores the aerodynamic decelerator in a stored state prior to deployment, the housing including a hatch that opens in response to initiation of aerodynamic decelerator deployment;
   an inflatable tube that is stored in the housing and configured to extend from the housing and deploy the aerodynamic decelerator away from the aerial vehicle in response to inflation of the inflatable tube, the inflatable tube having a side wall, a first end having a fluid port, and a closed second end that cooperate to define an enclosed interior of the inflatable tube, the first end connects to the housing and the second end having an exterior and a connector on the exterior that connects via a lead line to the aerodynamic decelerator; and
   a source of fluid coupled to the fluid port to selectively introduce fluid into the enclosed interior of the inflatable tube and inflate the inflatable tube to force the second end of the inflatable tube and the aerodynamic decelerator out of the housing and away from the aerial vehicle, wherein the inflatable tube and the lead line tethers the aerodynamic decelerator to the aerial vehicle.

2. The system of claim 1, wherein the housing further includes a base that is structured to removably mount the housing to the aerial vehicle.

3. The system of claim 1, wherein the housing is rigidly connected to the aerial vehicle and the first end of the inflatable tube is rigidly connected to the housing.

4. The system of claim 1, wherein the housing includes a first base component and a second base component, the first base component is sized and shaped to fit inside the second base component and to provide a friction fit with the first end of the inflatable tube between the first and second base components.

5. The system of claim 4, wherein the first base component includes an aperture sized and shaped to provide fluid communication between the source of fluid and the inflatable tube.

6. The system of claim 1, wherein the inflatable tube is structured to maintain pressurization after the inflatable tube is fully inflated to become a rigid member.

7. The system of claim 1, wherein the aerodynamic decelerator is a parachute.

8. An aerial vehicle, comprising:
   a body with at least one motor providing power to at least one rotor;
   a descent detection system that is operable to detect an uncontrolled descent of the aerial vehicle and to output a detection signal indicating the uncontrolled descent; and
   a descent restraint system, including:
      a parachute having shroud lines that upon deployment and opening creates drag to reduce a velocity of the aerial vehicle;
      a housing that attaches to the aerial vehicle and stores the parachute in a stored state prior to parachute deployment, the housing including a hatch that opens in response to initiation of parachute deployment;
      an inflatable tube that is stored in the housing and configured to extend therefrom to deploy the parachute away from the aerial vehicle, the inflatable tube having a side wall, a first end, and a second end that form an enclosed interior of the inflatable tube, the first end connects to the housing, and the second end having an exterior with a connector on the exterior that connects to the shroud lines of the parachute; and
      a source of fluid that is electrically coupled to the descent detection system to receive the detection signal from the descent detection system, the source of fluid is further fluidly coupled to the first end of the inflatable tube to introduce fluid into the enclosed interior of the inflatable tube in response to receipt of the detection signal from the descent detection system to thereby inflate the inflatable tube and force the second end of the inflatable tube and the parachute out of the housing and away from the aerial vehicle to enable the parachute to open without entangling the shroud lines in the aerial vehicle, whereby the inflatable tube tethers the parachute to the aerial vehicle.

9. The aerial vehicle of claim 8, wherein the housing further includes a base that is structured to removably mount the housing to the aerial vehicle.

10. The aerial vehicle of claim 8, wherein the housing is rigidly connected to the aerial vehicle and the first end of the inflatable tube is rigidly connected to the housing.

11. The aerial vehicle of claim 8, wherein the housing includes a first base component and a second base component, the first base component is sized and shaped to fit inside the second base component and provide a friction fit with the first end of the inflatable tube between the first and second base components.

12. The aerial vehicle of claim 8, wherein the inflatable tube is structured to maintain pressurization after the inflatable tube is fully inflated to become a rigid member.

13. A system to reduce a velocity of an aerial vehicle, comprising:
   a parachute having shroud lines attached to a canopy;
   a housing that attaches to the aerial vehicle and is sized and shaped to store the parachute;

an inflatable tube having a body with at least one sidewall, a proximal end that attaches to the housing, and a distal end that extends out of the housing and away from the aerial vehicle in response to inflation of the inflatable tube, the inflatable tube is sized and shaped to store inside the housing in response to deflation of the inflatable tube, and the body, the proximal end, and the distal end of the inflatable tube forming an enclosed interior of the inflatable tube, the distal end having an exterior surface and a connector on the exterior surface that connects to the shroud lines of the parachute; and a source of fluid that couples to the inflatable tube and selectively introduces fluid into the enclosed interior of the inflatable tube to inflate the inflatable tube and force the distal end of the inflatable tube and the attached parachute out of the housing and away from the aerial vehicle, wherein the inflatable tube tethers the parachute to the aerial vehicle.

14. The system of claim 13 wherein the inflatable tube remains inflated to hold the parachute canopy and the shroud lines away from the aerial vehicle after the distal end of the inflatable tube and the parachute are forced out of the housing and the parachute canopy deploys.

15. The system of claim 13 wherein the proximal end of the inflatable tube has a fluid port that forms a fluid connection point for the source of fluid.

16. The system of claim 13, wherein the housing includes a first base component and a second base component, the first base component is sized and shaped to fit inside the second base component to provide a friction fit with the proximal end of the inflatable tube between the first and second base components.

17. The system of claim 16, wherein the proximal end of the inflatable tube has a fluid port and the first base component includes an aperture sized and shaped to connect with the fluid port and provide fluid communication with the source of fluid.

18. The system of claim 13 wherein the housing further includes a base that removably mounts the housing to the aerial vehicle.

* * * * *